(12) United States Patent
Mino et al.

(10) Patent No.: US 8,467,212 B2
(45) Date of Patent: Jun. 18, 2013

(54) RECTIFIER CIRCUIT

(75) Inventors: Kazuaki Mino, Hino (JP); Satoru Fujita, Akishima (JP); Ryuji Yamada, Hachioji (JP)

(73) Assignee: Fuji Electric Co., Ltd. (JP)

( * ) Notice: Subject to any disclaimer, the term of this patent is extended or adjusted under 35 U.S.C. 154(b) by 394 days.

(21) Appl. No.: 12/951,365

(22) Filed: Nov. 22, 2010

(65) Prior Publication Data

US 2011/0122667 A1     May 26, 2011

(30) Foreign Application Priority Data

Nov. 26, 2009    (JP) ................................. 2009-268512
Jun. 4, 2010    (JP) ................................. 2010-128502

(51) Int. Cl.
*H02M 7/217*     (2006.01)
*H02M 7/06*     (2006.01)

(52) U.S. Cl.
USPC .......................................... 363/127; 363/126

(58) Field of Classification Search
USPC ................... 363/84, 89, 90, 125–127
See application file for complete search history.

(56) References Cited

U.S. PATENT DOCUMENTS

| 6,611,130 B2 * | 8/2003 | Chang ............................ 323/235 |
| 2011/0149622 A1 * | 6/2011 | Lin ................................. 363/124 |
| 2012/0086350 A1 * | 4/2012 | Lin et al. .................... 315/200 R |

FOREIGN PATENT DOCUMENTS

JP     2004-072846 A     3/2004

OTHER PUBLICATIONS

"Semiconductor Power Converter Circuit" IEEJ Semiconductor Power Conversion System Investigating Committee of Experts, Feb. 1987, p. 23. 1st ed., FIG. 2.5. 2, The Institute of Electrical Engineers of Japan. Partial english translation provided.
Xuechao, Lui "UCC28070 Implement Bridgeless Power Factor Correction (PFC) Pre-Regulator Design" Texas Instruments Application Report, Jul. 2009, pp. 1-13, SLUA517.

\* cited by examiner

*Primary Examiner* — Matthew Nguyen
(74) *Attorney, Agent, or Firm* — Rossi, Kimms & McDowell LLP

(57) ABSTRACT

A high power factor rectifier circuit, provided with switching sections connected to an AC power supply for converting an AC voltage to a DC voltage, is formed with a bypass circuit provided. The bypass circuit, when the voltage of the AC power supply becomes higher than the voltage across a smoothing capacitor provided on the DC output side, makes a charge current flowing from the AC power supply to the capacitor bypass the switching section by making the switching section out of conduction. Thus, a rectifier circuit is provided which can be safely operated without causing any damage, or with minimized damage, even though an inrush current flows at turning-on the power or at recovery from a power interruption.

21 Claims, 18 Drawing Sheets

RECTIFIER CIRCUIT

BACKGROUND OF THE INVENTION

1. Field of the Invention

The present invention relates to a so-called rectifier circuit converting an AC voltage to a DC voltage, and particularly to a rectifier circuit preventing a switching device from being damaged by an excessive inrush current flowing in the switching device at recovery of an AC power supply from an interruption or at turning-on the power.

2. Background Art

Previously, a rectifier circuit as shown in FIG. 19 has been known. In the rectifier circuit, fast recovery diodes $D_1$ and $D_2$ forming upper arms are connected to their respective switching devices $Q_1$ and $Q_2$ of MOSFETs forming lower arms in series to form legs (series circuits) connected in parallel. To the connection point of the fast recovery diode $D_1$ and the MOSFET $Q_1$ and the connection point of the fast recovery diode $D_2$ and the MOSFET $Q_2$, an AC voltage is supplied from an AC power supply 1 through inductors $L_1$ and $L_2$, respectively. Moreover, in parallel to the series circuits, a capacitor C for smoothing a rectified DC voltage $E_d$ is connected so that the rectified DC voltage $E_d$ is supplied to a load side.

An operation of thus formed rectifier circuit will be explained in order. The MOSFET $Q_1$ is made turned-on when the polarity of a voltage $V_{in}$ of the AC power supply 1 is positive (when the head of an arrow is on the positive side and the tail of the arrow is on the negative side, the same is true in the following). Then, a current increases while flowing along a path of the AC power supply 1→the inductor $L_1$→the MOSFET $Q_1$→a body diode of the MOSFET $Q_2$ (illustrated with a broken line)→inductor $L_2$→the AC power supply 1.

Subsequent to this, the MOSFET $Q_1$ is made turned-off. Then, a current flowing in the inductor $L_1$ and $L_2$ gradually decreases while commutating along a path of the inductor $L_1$→the fast recovery diode $D_1$→the capacitor C→the body diode of the switching device $Q_2$→the inductor $L_2$→the AC power supply 1→the inductor $L_1$. At this time, energy stored in L1 and L2 is supplied to the side.

Also in the case when the polarity of the voltage of the AC power supply 1 is negative (when the head of an arrow is on the negative side and the tail of the arrow is on the positive side, the same is true in the following), the symmetry of the circuit results in a similar operation by making the MOSFET $Q_2$ turned-on and -off. With the MOSFETs $Q_1$ and $Q_2$ driven in this way by adequate control signals, while controlling the waveform of an inputted current sinusoidally, a desired DC voltage can be obtained. In the above-explained rectifier circuit, a step-up operation is carried out, by which a DC output voltage in a normal operation becomes equal to or more than the maximum value of the inputted AC voltage.

In the rectifier circuit formed as was explained in the foregoing, at turning-on the AC power or at recovery from a power interruption, the voltage of the AC power supply 1 sometimes becomes higher than the voltage across the capacitor C. At this time, with the polarity of the voltage $V_{in}$ of the AC power supply 1 being positive, for example, an inrush current flows along a path of the AC power supply 1→the inductor $L_1$→the fast recovery diode $D_1$→the capacitor C→the body diode of the switching device $Q_2$→the inductor $L_2$→the AC power supply 1. That is, an excessive current is to flow in the fast recovery diodes $D_1$ and $D_2$ and the switching devices $Q_1$ and $Q_2$.

In a normal operation, when the switching device $Q_1$ is made turned-on, the fast recovery diode $D_1$ is made turned-off to apply the voltage across the capacitor C to the fast recovery diode $D_1$. This brings the fast recovery diode $D_1$ into a reverse recovery state. In the same way, when the switching device $Q_2$ is made turned-on, the fast recovery diode $D_2$ is brought into a reverse recovery state. This requires the use of fast recovery diodes each having a short reverse recovery time for the diodes $D_1$ and $D_2$. Each of a fast recovery diode and a switching device (including a body diode) has a low forward surge current capability, so that it might cause a possible damage when an inrush current flows. In addition, a Schottky diode of SiC (silicon carbide) as its material also has an excellent reverse recovery characteristic, so that it can be used as an alternative of each of the fast recovery diodes $D_1$ and $D_2$. Such a Schottky diode, however, similarly has a low current blocking capability that causes possible damage when an inrush current flows.

Thus, for protecting fast recovery diodes and switching devices from an inrush current, a rectifier system is known in which no excessive current is made to flow in such devices (see JP-A-2004-72846, for example). The rectifier system, as shown in FIG. 20, is provided with two legs (series circuits) formed of slow recovery diodes $D_{10}$ and $D_{11}$ forming their respective upper arms in the legs and thyristors $Th_1$ and $Th_2$ forming their respective lower arms in the legs. To the connection point of the AC power supply 1 and an inductor $L_1$, the connection point of the upper arm with the slow recovery diode $D_{10}$ and the lower arm with the thyristor $Th_1$ in one series circuit is connected, and to the connection point of the AC power supply 1 and an inductor $L_2$, the connection point of the upper arm with the slow recovery diode $D_{11}$ and the lower arm with the thyristor $Th_2$ in the other series circuit is connected. Moreover, the cathodes of the slow recovery diodes $D_{10}$ and $D_{11}$ are connected to on the positive polarity side of a DC power supply line and the anodes of the thyristors $Th_1$ and $Th_2$ are connected to on the negative polarity side of the DC power supply line.

With the rectifier circuits thus formed, the inrush current explained in the foregoing flows in the slow recovery diodes $D_{10}$ and $D_{11}$ and the thyristors $Th_1$ and $Th_2$ each having a large forward surge current capability without flowing in the fast recovery diodes $D_1$ and $D_2$ and the switching devices $Q_1$ and $Q_2$. Therefore, the rectifier system disclosed in JP-A-2004-72846 can be safely operated without damaging devices forming the system. The reference voltage of the controller of a rectifier system with such a configuration is an electric potential of the source of each of the switching devices $Q_1$ and $Q_2$. Compared with this, the thyristors $Th_1$ and $Th_2$ are driven with the electric potential of the cathode of each of them taken as a reference (see Denki Gakkai Handoutai Denryoku Henkan-houshiki Chousa Senmon Iinkai hen, Handoutai Denryoku Henkan Kairo, dai 1 pan, Shadan-houjin Denki Gakkai, 1987nen 2gatsu, p. 23, (Zu 2.5.2) (in Japanese), (IEEJ Semiconductor Power Conversion System Investigating Committee of Experts, Semiconductor Power Converter Circuit, 1st ed., p 23 (FIG. 2.5.2), The Institute of Electrical Engineer of Japan, February 1987), for example).

[Patent Document 1] JP-A-2004-72846

[Non-Patent Document 1] Denki Gakkai Handoutai Denryoku Henkan-houshiki Chousa Semmon Iinkai hen, Handoutai Denryoku Henkan Kairo, dai 1 pan, Shadan-houjin Denki Gakkai, 1987nen 2gatsu, p. 23, (Zu 2.5.2) (in Japanese), (IEEJ Semiconductor Power Conversion System Investigating Committee of Experts, Semiconductor Power Converter Circuit, 1st ed., p 23 (FIG. 2. 5. 2), The Institute of Electrical Engineer of Japan, February 1987)

The reference voltage of the controller of the above explained rectifier system is the electric potential of the source of each of the switching devices $Q_1$ and $Q_2$. Compared with this, the thyristors $Th_1$ and $Th_2$ must be driven with the electric potential of the cathode of each of them taken as a reference. Therefore, the driving circuit necessitates devices such as a pulse transformer for insulation as is shown in the "Semiconductor Power Converter Circuit" (non-patent document). This results in a complicated driving circuit in the above explained rectifier system, which causes a new problem in that the system becomes large-sized and highly expensive.

SUMMARY OF THE INVENTION

Embodiments of the invention address the above-described problems with an object of providing a rectifier circuit which can be safely operated without causing any damage of the system even though an inrush current flows at recovery from a power interruption or at turning-on the power. Moreover, another object of embodiments of the invention is to provide a rectifier circuit which enables actualization of downsizing and cost reduction by forming a bypass circuit of an inrush current with low voltage switching devices and slow recovery diodes without using high voltage thyristors and by further making all of self-turn-off power devices driven at the same electric potential.

For achieving the above explained object, a rectifier circuit according to the invention is characterized by including: an inductor with a first end thereof connected to an AC power supply; a plurality of series circuits in each of which a first end of a first diode and a first end of a switching section are connected to each other, to the connection point of the first end of the first diode and the first end of the switching section, the inductor being connected with a second end thereof; a first DC line to which a second end of the first diode in each of a plurality of the series circuits is connected; a second DC line to which a second end of the switching section in each of a plurality of the series circuits is connected; a capacitor connected between the first DC line and the second DC line; a second diode connected between the first end of the inductor and the first DC line; and a bypass circuit which is formed so that a charge current flowing from the AC power supply to the capacitor bypasses a plurality of the series circuits by making the switching sections out of conduction when the voltage of the AC power supply becomes higher than the voltage across the capacitor.

The rectifier circuit explained above, at turning-on the power or at recovery from a power interruption, that is, when the AC power supply voltage becomes higher than the voltage across the smoothing capacitor provided on the DC side, makes the switching section out of conduction. Then, an inrush current (surge current) flowing from the AC power supply into the capacitor flows through the bypass circuit. Therefore, the rectifier circuit according to the invention can protect self-turn-off power devices and fast recovery diodes in the switching sections from the surge current.

More specifically, the switching section is formed by including: a first semiconductor switching device to which a third diode is connected in inverse parallel; and a second semiconductor switching device to which a fourth diode is connected in inverse parallel, the first and second semiconductor switching devices being connected in series with their respective directions of conduction made opposite to each other, the bypass circuit having a fifth diode connected in parallel to the switching section, and the fifth diode having a forward surge current capability higher than that of the first diode. For example, for the second and fifth diodes, slow recovery diodes are used.

Instead, the switching section can be formed to include: a third diode connected in inverse parallel to a first semiconductor switching device, to the connection point of the first end of the first diode and the first end of the first semiconductor switching device, the inductor being connected with a second end thereof; a fourth diode connected in inverse parallel to the second semiconductor switching device; and a fifth diode connected between the second DC line and the connection point to which the first end of the first diode and the first end of the first semiconductor switching device in the series circuit are connected. The fifth diode is made to have a forward surge current capability higher than that of the first diode.

In the rectifier circuit explained in the foregoing, when a surge current is going to flow into the capacitor, the switching section with a low forward surge current capability is made out of conduction to let the surge current flow in the second diode and the fifth diode each with a high forward surge current capability.

The rectifier circuit according to the invention can be formed by using a third semiconductor switching device with a sixth diode connected in inverse parallel thereto which is substituted for the first diode.

Instead, the rectifier circuit according to the invention can be formed so as to provide a second series circuit substituted for the first diode. The second series circuit can be formed to include: a third semiconductor switching device with a sixth diode connected in inverse parallel thereto; and a fourth semiconductor switching device with a seventh diode connected in inverse parallel thereto, in which the third semiconductor switching device and the fourth semiconductor switching device are connected in series so that the directions of conduction of the sixth and seventh diodes become opposite to each other.

Furthermore, the rectifier circuit according to the invention is formed to include: a bridge circuit formed of four diodes of series connected two first diodes and series connected two fourth diodes, the fourth diode having a forward surge current capability higher than that of the first diode; at least one inductor inserted between the bridge circuit and an AC power supply so that one end thereof is connected to the AC power supply and the other end thereof is connected to at least one of the connection point of the series connected two first diodes and the connection point of the series connected two fourth diodes in the bridge circuit; a first and second DC lines in which a DC current outputted from the bridge circuit flows; a capacitor connected between the first and second DC lines; a first semiconductor switching device with a second diode connected in inverse parallel thereto; a second semiconductor switching device with a third diode connected in inverse parallel thereto; a series circuit in which the first semiconductor switching device and the second semiconductor switching device are connected in series so that the directions of conduction of the first and second switching devices become opposite to each other; and a switching section in which the series circuit is connected in parallel to each of the series connected two fourth diodes to be connected between the first and second DC lines.

The fourth diode that is connected in parallel to the series circuit has a forward surge current capability higher than that of the first diode that is not connected in parallel to the series circuit. Thus, when a surge current is going to flow into the capacitor, the switching section with a low forward surge current capability is made to be out of conduction, by which the surge current is made to flow in the fourth diodes with a high forward surge current capability.

The fifth diode can be formed of a plurality of diodes connected in series.

Another one of the rectifier circuit according to the invention is characterized by including: an inductor with a first end thereof connected to an AC power supply; a plurality of series circuits in each of which a first end of a first diode and a first end of a switching section are connected to each other, to the connection point of the first end of the first diode and the first end of the switching section, the inductor being connected with a second end thereof; a first DC line to which a second end of the first diode in each of a plurality of the series circuits is connected; a second DC line to which a second end of the switching section in each of a plurality of the series circuits is connected; a capacitor connected between the first DC line and the second DC line; a second diode connected between the first end of the inductor and the first DC line; and a bypass circuit which is formed so that a charge current flowing from the AC power supply to the capacitor bypasses a plurality of the series circuits by making the switching sections out of conduction when the value of a current flowing from the AC power supply to the switching sections becomes equal to or larger than a specified value, in which the switching section is made in conduction again when the value of the charge current becomes equal to or smaller than the specified value.

Moreover, in the rectifier circuit according to the invention, the charge current is detected by a current detector inserted into a path of a current flowing in the bypass circuit.

Instead, the charge current can be detected by a first voltage detector detecting the anode-cathode voltage of the fifth diode.

Furthermore, the charge current can be detected by a second voltage detector detecting a voltage between the main circuit terminals of the second switching device in the switching section.

According to the rectifier circuit formed as was explained in the foregoing, a forward voltage drop of a diode can be made increased, by which an amount of diverted current in a normal operation of the rectifier circuit can be made sufficiently reduced or reduced to zero. Moreover, to the slow recovery diode, as a device with a small current capacity, a miniature and low-priced device such as a device for surface mounting, for example, can be applied, by which a system can be made smaller and lower-priced than in the case of using one diode with a large current capacity. Moreover, since a slow recovery diode produces no loss in a normal operation, no provision of cooling means is necessary.

Furthermore, the rectifier circuit according to the invention makes an inrush current flow in a slow recovery diode with a high forward surge current capability to bypass switching devices and fast recovery diodes with low forward surge current capabilities. Thus, the rectifier circuit is able to make the switching devices safely operated without being damaged. Moreover, the rectifier circuit according to the invention, also in the case when an inrush current becomes low, is able to return to a normal operation safely and quickly.

According to the rectifier circuit of the invention, at recovery from a power interruption or at turning-on the power, the switching section is made turned-off to let an inrush current into a bypass circuit. Thus, semiconductor switching devices with low surge blocking capability can be protected. This allows the rectifier circuit according to the invention to be prevented from being damaged by a surge current and to be safely operated. Moreover, the bypass circuit can be formed with low breakdown voltage switching devices and slow recovery diodes without using high breakdown voltage thyristors. Furthermore, the rectifier circuit according to the invention is capable of driving self-turn-off power devices at the same electric potential to allow the driving circuit to be provided without being insulated.

In this way, the rectifier circuit according to the invention can practically provide the excellent advantages of being able to become downsized and low cost.

DESCRIPTION OF THE PREFERRED EMBODIMENT

In the following, explanations of embodiments of the invention will be made with respect to several examples with reference to attached drawings. The examples explained here are those of the embodiments for explaining the invention and the invention is not limited to the embodiments.

Example 1

Figure 1:
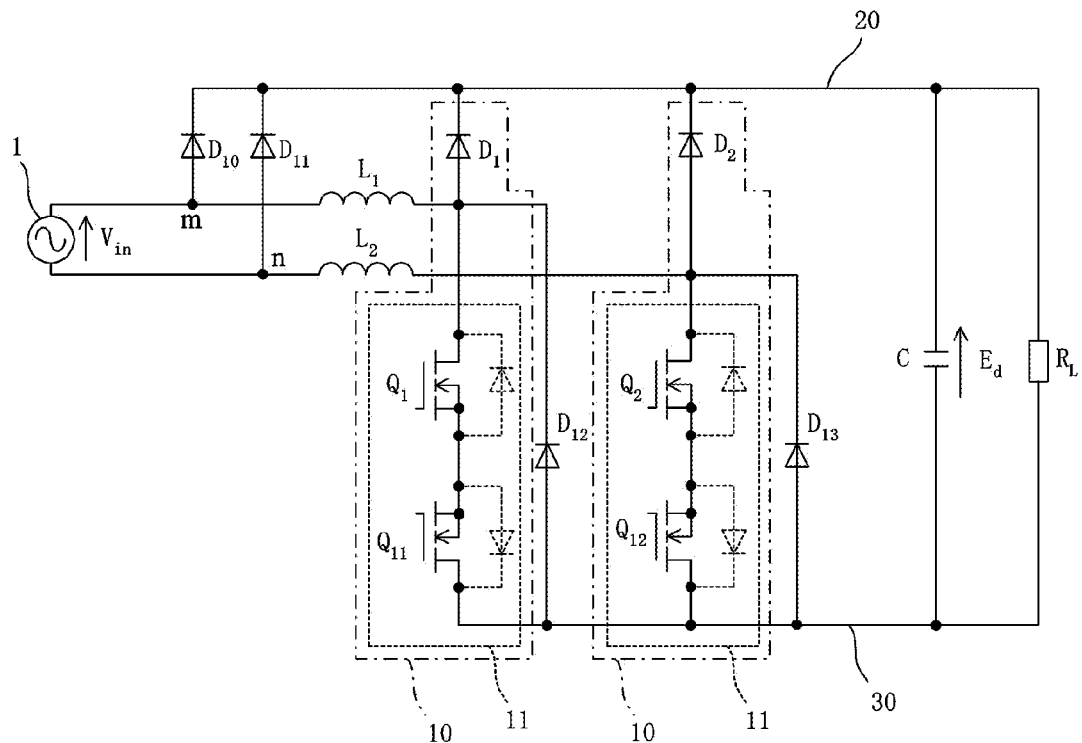
FIG. 1 is a circuit diagram showing a rectifier circuit according to an example 1 of the invention.
Figure 19:
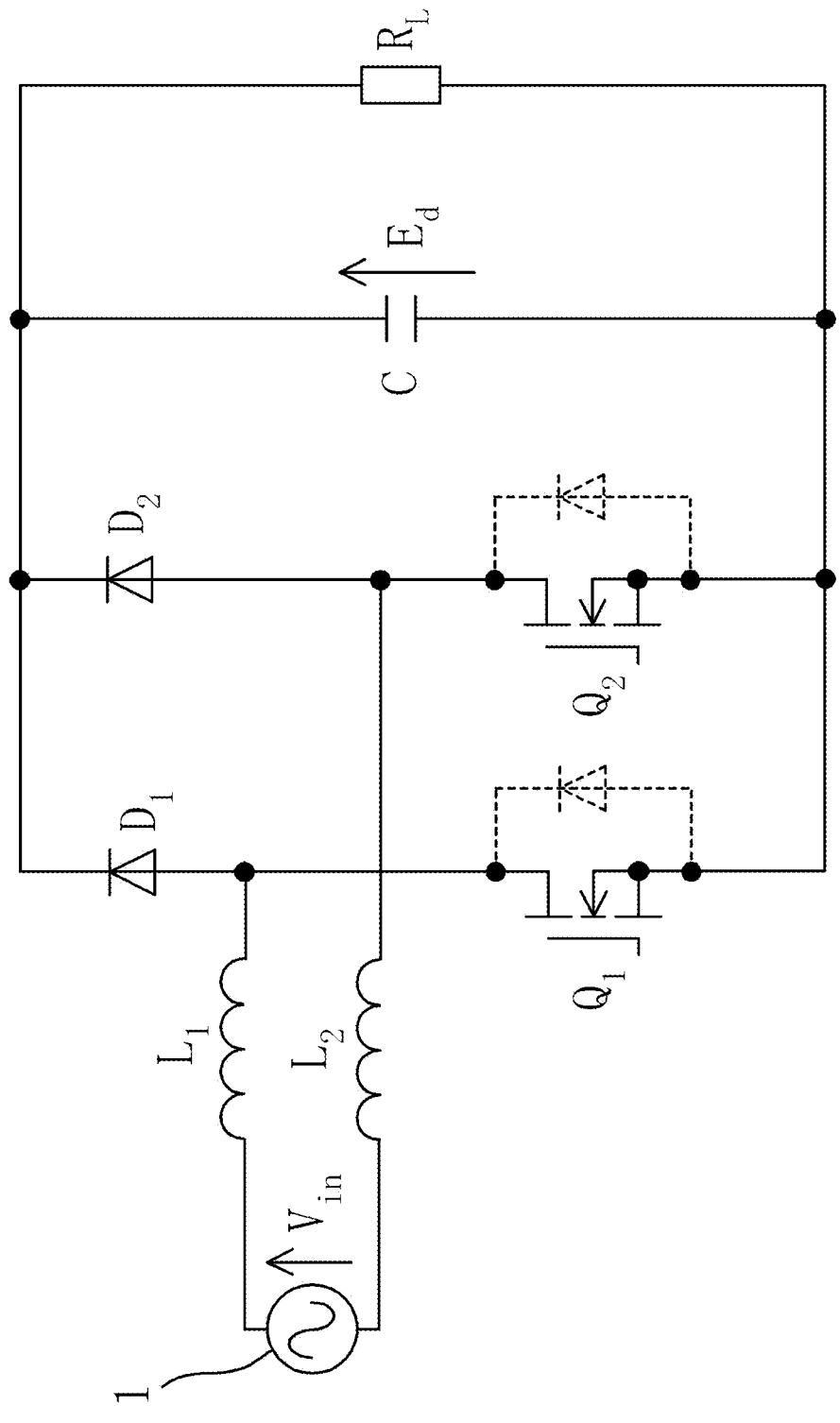
FIG. 19 is a circuit diagram showing a related rectifier circuit.
Figure 20:
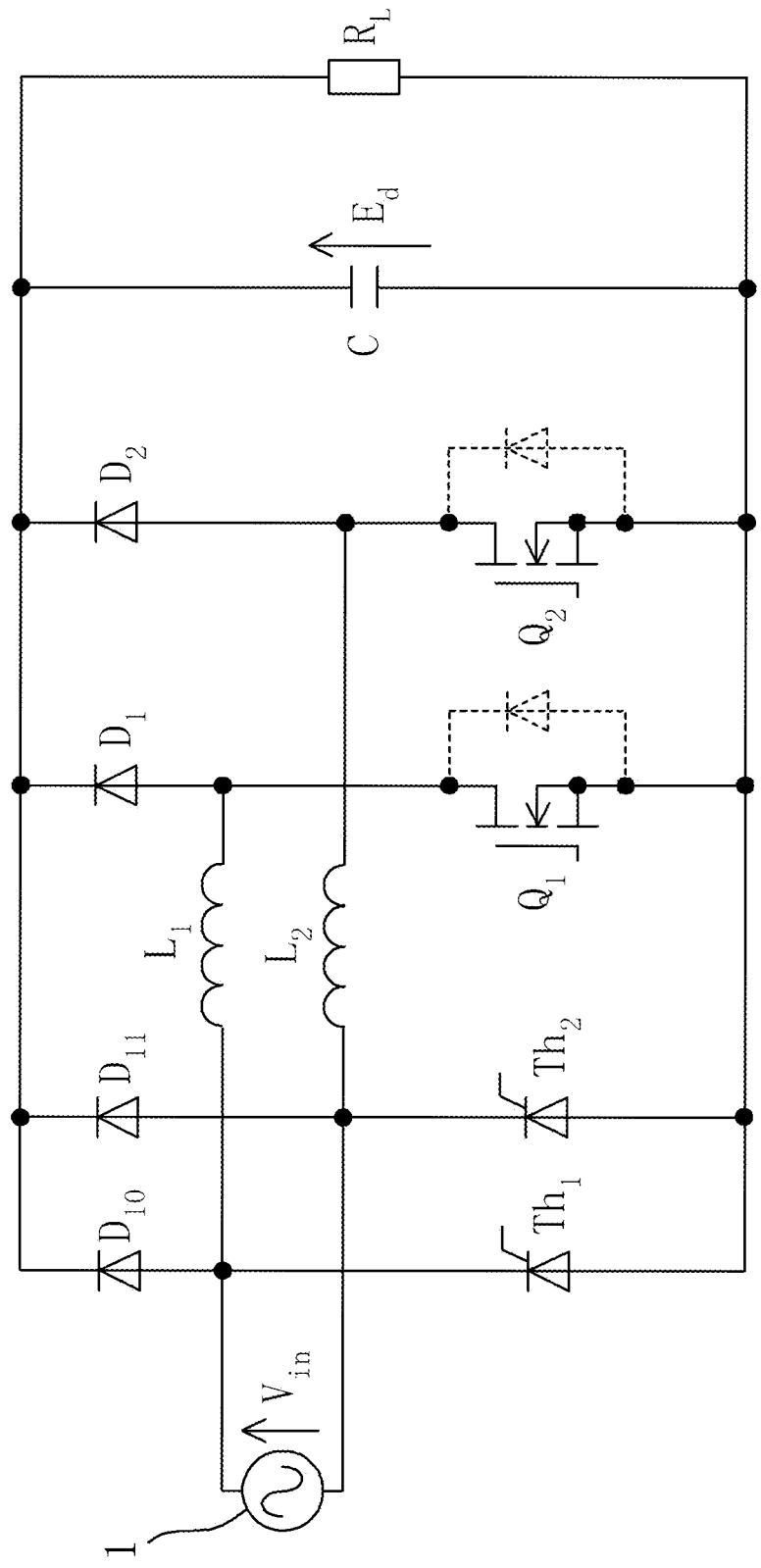
FIG. 20 is a circuit diagram showing another related rectifier circuit different from the circuit shown in FIG. 19.

FIG. 1 is a circuit diagram showing a rectifier circuit according to an example 1 of the invention. In FIG. 1, constituents denoted by the same reference numerals or signs as those in FIG. 19 are identical ones with the basic configurations being the same as those in the related rectifier circuit shown in FIG. 19. In FIG. 1, reference numeral 1 denotes an AC power supply. One end of the AC power supply 1 is connected to one series circuit 10 through an inductor $L_1$ and the other end of the AC power supply 1 is connected to the other series circuit 10 through an inductor $L_2$. Each of the series circuits 10 forms a rectifier circuit converting an AC voltage to a DC voltage. A DC voltage with a positive polarity outputted from the series circuits 10 is supplied to a first DC line 20 and a DC voltage with a negative polarity is supplied to a second DC line 30. Between the first DC line 20 and the second DC line 30, a smoothing capacitor C is connected. A DC voltage $E_d$ obtained across the capacitor C is supplied to a load $R_L$. Moreover, between a connection point m, at which one end of the AC power supply 1 and one end (a first end) of the inductor $L_1$ is connected, and the first DC line 20, a slow recovery diode $D_{10}$ is connected. Between a connection point n, at which the other end of the AC power supply 1 and one end (a first end) of the inductor $L_2$ is connected, and the first DC line 20, a slow recovery diode $D_{11}$ is connected.

The characterized point of the rectifier circuit according to the invention formed as was explained in the foregoing is in outline the configuration of the series circuit 10. In the one series circuit 10, a first semiconductor switching device $Q_1$ provided with a third diode (illustrated by a broken line) connected in inverse parallel thereto and a second semiconductor switching device $Q_{11}$ provided with a fourth diode (illustrated by a broken line) connected in inverse parallel thereto are connected in series with their respective directions of conduction being made reversed with each other to form one switching section 11. Moreover, in the other series circuit 10, a first semiconductor switching device $Q_2$ provided with a third diode (illustrated by a broken line) connected in inverse parallel thereto and a second semiconductor switching device $Q_{12}$ provided with a fourth diode (illustrated by a broken line) connected in inverse parallel thereto are connected in series with their respective directions of conduction being made reversed with each other to form the other switching section 11. Across the switching section 11 (a first end is the drain of the first semiconductor switching device ($Q_1$, $Q_2$) and a second end is the drain of the second semiconductor switching device ($Q_{11}$, $Q_{12}$)), a fifth diode ($D_{12}$, $D_{13}$) is connected in parallel. Between the first end of the switching section 11 and the first DC line 20, a first diode ($D_1$, $D_2$) as a fast recovery diode is connected to form the series circuit 10.

The fifth diode ($D_{12}$, $D_{13}$) is a diode having a forward surge current capability higher than that of the first diode ($D_1$, $D_2$). Specifically, a slow recovery diode is used.

In addition, to the connection points, at which the first diodes (anodes of $D_1$ and $D_2$) in their respective series circuits 10 and the first ends of their respective switching sections 11 are connected, the other ends (second ends) of the inductors $L_1$ and $L_2$ are connected, respectively.

An explanation will be made with respect to the operation of thus formed rectifier circuit according to the invention.

At a normal operation, the MOSFETs $Q_{11}$ and $Q_{12}$ are constantly made turned-on by a gate controller not shown. While, the MOSFETs $Q_1$ and $Q_2$ are subjected to switching at a fast recovery by the gate controller. Thus, an input current inputted from the AC power supply 1 and an output voltage outputted from the series circuits 10 are controlled. Here, suppose that the MOSFET $Q_1$ is made turned-on by the gate controller in a period in which the polarity of the voltage $V_{in}$ of the AC power supply 1 is positive, for example. Then, a current increases which flows along a path of the AC power supply 1→the inductor $L_1$→the MOSFET $Q_1$→the MOSFET $Q_{11}$→the MOSFET $Q_{12}$→a body diode of the MOSFET $Q_2$ (illustrated with a broken line)→the inductor $L_2$→the AC power supply 1. At this time, energy is stored in each of the inductors $L_1$ and $L_2$.

Next, with the MOSFET $Q_1$ made turned-off by the gate controller, a current decreases which flows along a path of the inductor $L_1$→the fast recovery diode $D_1$→the capacitor C→the MOSFET $Q_{12}$→the body diode of the MOSFET $Q_2$→the inductor $L_2$→the AC power supply 1→the inductor $L_1$. At this time, the energy stored in each of the inductor $L_1$ and $L_2$ is supplied to the load side.

Also in a period in which the polarity of the voltage $V_{in}$ of the AC power supply 1 is negative, the symmetry of the circuit results in a similar operation by making the MOSFET $Q_2$ turned-on and -off. That is, the rectifier circuit shown in FIG. 1 can control an input current and an output voltage with the gate controller adequately controlling the MOSFETs $Q_1$ and $Q_2$ like in the related rectifier circuit shown in FIG. 19.

Incidentally, at turning-on the power or at recovery from a power interruption, the voltage of the capacitor C sometimes becomes lower than the voltage $V_{in}$ of the AC power supply 1. For example, when the voltage $V_{in}$ of the AC power supply 1 becomes higher than the voltage of the capacitor C with the polarity of the voltage $V_{in}$ of the AC power supply 1 being positive, the gate controller turns off the MOSFETs $Q_{11}$ and $Q_{12}$. Then, an inrush current flows in a path of the AC power supply 1→the slow recovery diode $D_{10}$→the capacitor C→the slow recovery diode $D_{13}$→the inductor $L_2$→the AC power supply 1. Therefore, no inrush current flows in the fast recovery diode $D_1$ and the MOSFET $Q_2$ each having low forward surge current capability. That is, the rectifier circuit according to the invention can make an inrush current bypass the fast recovery diode $D_1$ and the MOSFET $Q_2$ with the use of the slow recovery diodes $D_{10}$ and $D_{13}$.

Similarly, also in a period in which the polarity of the voltage $V_{in}$ of the AC power supply 1 is negative, an inrush current flows in the slow recovery diodes $D_{11}$ and $D_{12}$ and no excessive current flows in the fast recovery diode $D_2$ and the MOSFET $Q_1$.

In this way, the rectifier circuit according to the invention makes an inrush current flow in the slow recovery diodes with high forward surge current capabilities to bypass the fast recovery diodes $D_1$ and $D_2$ and the MOSFETs $Q_1$ and $Q_2$ to enable the rectifier circuit to be operated safely without damaging the switching devices. Moreover, the maximum voltages applied to the MOSFETs $Q_{11}$ and $Q_{12}$ are forward voltages of the slow recovery diodes $D_{12}$ and $D_{13}$, respectively, which are very low voltages. This allows a switching device with a low breakdown voltage to be applied to each of the MOSFETs $Q_{11}$ and $Q_{12}$. A MOSFET with a low breakdown voltage has a low on-resistance, so that the conduction loss of each of the MOSFETs $Q_{11}$ and $Q_{12}$ becomes very small. Therefore, according to the invention, a small and inexpensive device can be used for each of the MOSFETs $Q_{11}$ and $Q_{12}$, by which losses in the rectifier circuit can be also reduced.

Figure 2:
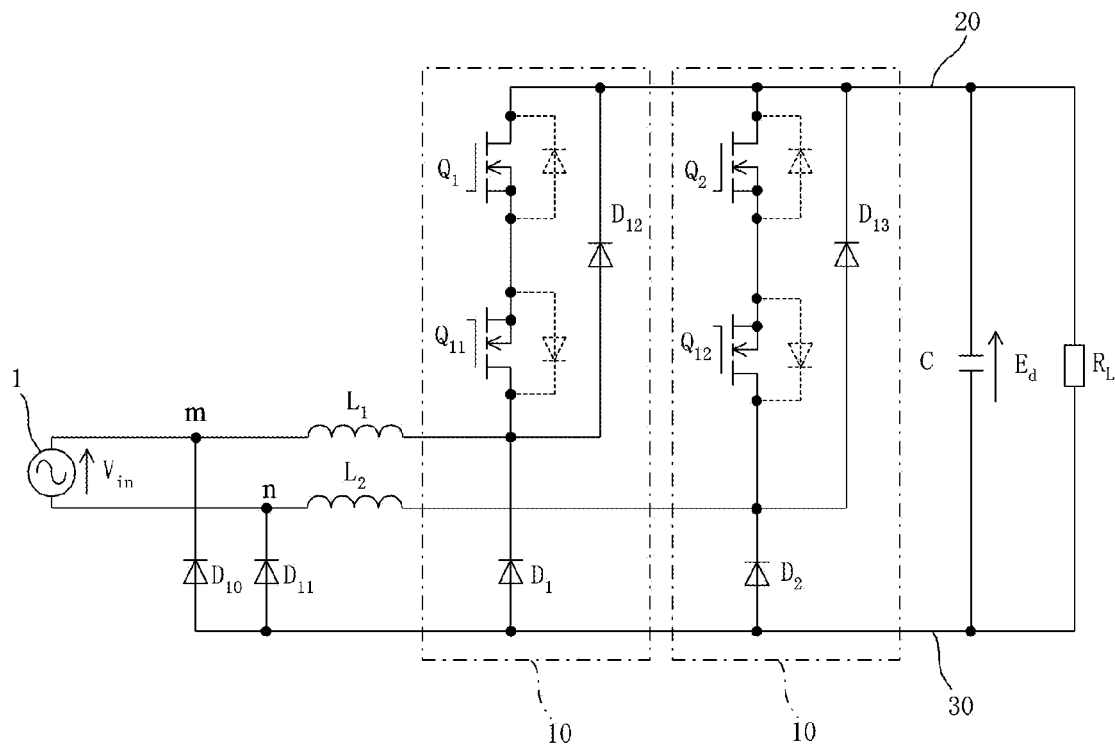
FIG. 2 is a circuit diagram showing a rectifier circuit as an example of a modification of the rectifier circuit of the example 1 shown in FIG. 1.

FIG. 2 is a circuit diagram showing a rectifier circuit as an example of a modification of the rectifier circuit of the example 1 shown in FIG. 1. In the rectifier circuit, polarities of the switching devices in the example 1 are made reversed. Namely, both ends of the AC power supply 1 are connected to the series circuits 10 through the inductors $L_1$ and $L_2$, respectively. A DC voltage with positive polarity outputted from each of the series circuits 10 is supplied to the first DC line 20 and a DC voltage with negative polarity is supplied to the second DC line 30 through each of the fast recovery diodes $D_1$ and $D_2$.

Moreover, between a connection point m, at which one end of the AC power supply 1 and one end (the first end) of the inductor $L_1$ is connected, and the second DC line 30, a slow recovery diode $D_{10}$ is connected. Between a connection point n, at which the other end of the AC power supply 1 and one end (the first end) of the inductor $L_2$ is connected, and the second DC line 30, a slow recovery diode $D_{11}$ is connected. In addition, the fifth diode ($D_{12}$, $D_{13}$) is a diode having a forward surge current capability higher than that of the first diode ($D_1$, $D_2$). Specifically, a slow recovery diode is used.

It is needless to say that even in thus formed modification of the example 1, a similar advantage to that of the example 1 can be obtained.

Example 2

Figure 3:
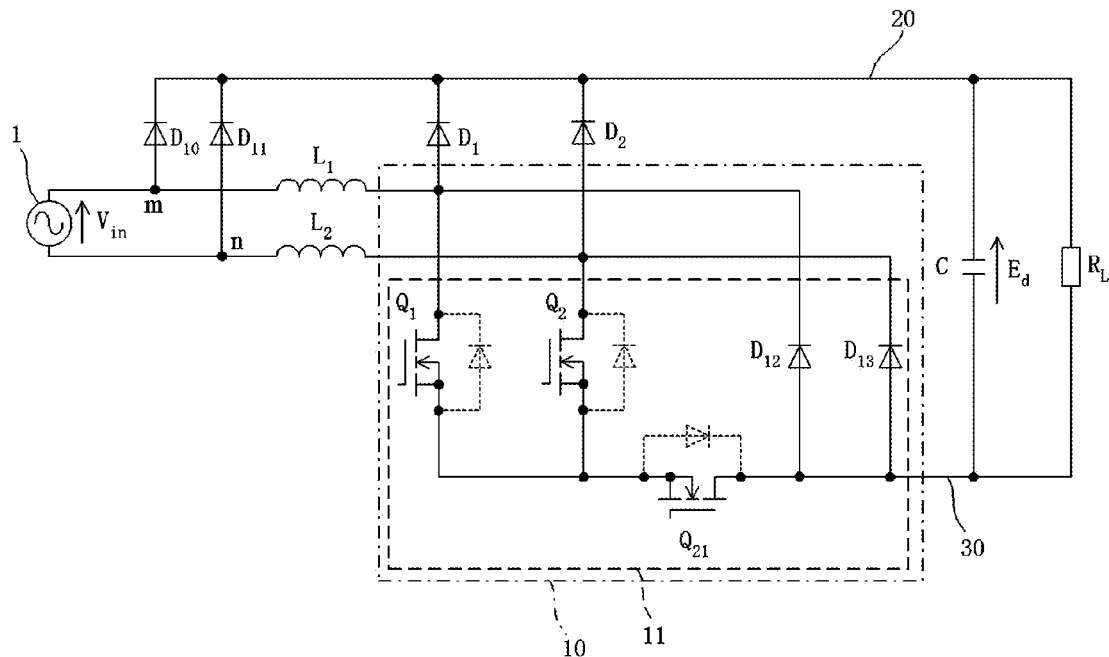
FIG. 3 is a circuit diagram showing a rectifier circuit according to an example 2 of the invention.

FIG. 3 is a circuit diagram showing a rectifier circuit according to an example 2 of the invention. The difference from the example 1 lies in the configuration of the switching section 11. In the switching section 11 in the example 2, the second ends (sources) of the first semiconductor switching devices $Q_1$ and $Q_2$, each having a third diode connected in inverse parallel thereto, are connected together. To the connection point, the source of a MOSFET ($Q_{21}$; a second semiconductor switching device) is further connected which has a fourth diode (illustrated with a broken line) connected in inverse parallel thereto.

At a normal operation, the MOSFET $Q_{21}$ is constantly made turned-on by a gate controller not shown, by which the MOSFETs $Q_1$ and $Q_2$ are subjected to switching at a fast recovery. With the gate controller adequately driving the MOSFETs $Q_1$ and $Q_2$, an input current and an output voltage can be controlled. Specifically, with the MOSFET $Q_1$ being made turned-on by the gate controller in a period in which the polarity of the voltage $V_{in}$ of the AC power supply 1 is positive, a current increases which flows along a path of the AC power supply 1→the inductor $L_1$→the MOSFET $Q_1$→a body diode of the MOSFET $Q_2$→the inductor $L_2$→the AC power supply 1, by which energy is stored in each of the inductors $L_1$ and $L_2$.

Next, with the MOSFET $Q_1$ made turned-off by the gate controller, a current decreases which flows along a path of the inductor $L_1$→the fast recovery diode $D_1$→the capacitor C→the switching device $Q_{21}$→the body diode of the switching device $Q_2$→the inductor $L_2$→the AC power supply 1→the inductor $L_1$. At this time, the energy stored in each of the inductor $L_1$ and $L_2$ is supplied to the load side.

Also in a period in which the polarity of the voltage of the AC power supply 1 is negative, the symmetry of the circuit results in a similar operation by making the MOSFET $Q_2$ turned-on and -off. In this way, the rectifier circuit according to the invention can control an input current and an output voltage with the gate controller adequately driving the MOSFETs $Q_1$ and $Q_2$ equally in the related rectifier circuit shown in FIG. 19.

Furthermore, the rectifier according to the invention, at turning-on the power or at recovery from a power interruption, can make an inrush current charging the capacitor C bypass the fast recovery diodes $D_1$ and $D_2$ and the MOSFETs $Q_1$ and $Q_2$ by using the slow recovery diodes $D_{10}$ to $D_{13}$. For example, when the voltage $V_{in}$ of the AC power supply 1 becomes higher than the voltage of the capacitor C in a period in which the polarity of the voltage $V_{in}$ of the AC power supply 1 being positive, the gate controller turns-off the MOSFET $Q_{21}$. Then, an inrush current flows in a path of the AC power supply 1→the slow recovery diode $D_{10}$→the capacitor C→the slow recovery diode $D_{13}$→the inductor $L_2$→the AC power supply 1. Therefore, no inrush current flows in the fast recovery diode $D_1$ and the MOSFET $Q_2$ each having low forward surge current capability. Similarly, also in a period in which the polarity of the voltage $V_{in}$ of the AC power supply 1 is negative, an inrush current flows in the slow recovery diodes $D_{11}$ and $D_{12}$ and no excessive current flows in the fast recovery diode $D_2$ and the MOSFET $Q_1$.

In this way, the rectifier circuit according to the invention makes an inrush current flow in the slow recovery diodes with high forward surge current capabilities to bypass the fast recovery diodes $D_1$ and $D_2$ and the MOSFETs $Q_1$ and $Q_2$ to enable the rectifier circuit to be operated safely without damaging the switching devices and the fast recovery diodes. Moreover, the maximum value of the voltages applied to the MOSFET $Q_{21}$ is the forward voltage of each of the slow recovery diodes $D_{12}$ and $D_{13}$, which are very low voltages. This allows a switching device with a low breakdown voltage to be applied to the MOSFET $Q_{21}$.

In the example 2, the roles of the MOSFETs $Q_{11}$ and $Q_{12}$ in the example 1 can be performed by one MOSFETs $Q_{21}$, by which the number of parts can be reduced. Furthermore, compared with the example 1 in which both or one of the MOSFETs $Q_{11}$ and $Q_{12}$ has a current flow therein in a normal operation, in the example 2, no current flows in the MOSFET $Q_{21}$ in a period in which either one of the MOSFETs $Q_1$ or $Q_2$ is made turned-on (a current increasing period). Therefore, further reduction in a loss can be made possible.

Furthermore, in the example 2, the sources of the three MOSFETs $Q_{11}$, $Q_{12}$ and $Q_{21}$ are brought to be at the same electric potential. This allows the three MOSFETs $Q_{11}$, $Q_{12}$ and $Q_{21}$ to be driven by a gate driving circuit at an electric potential common to the MOSFETs. In this way, the rectifier circuit according to the example 2, unlike related rectifier circuits, all of the switching devices can be directly driven without insulation, which allows the gate driving circuit to be downsized at lowered cost.

Figure 4:
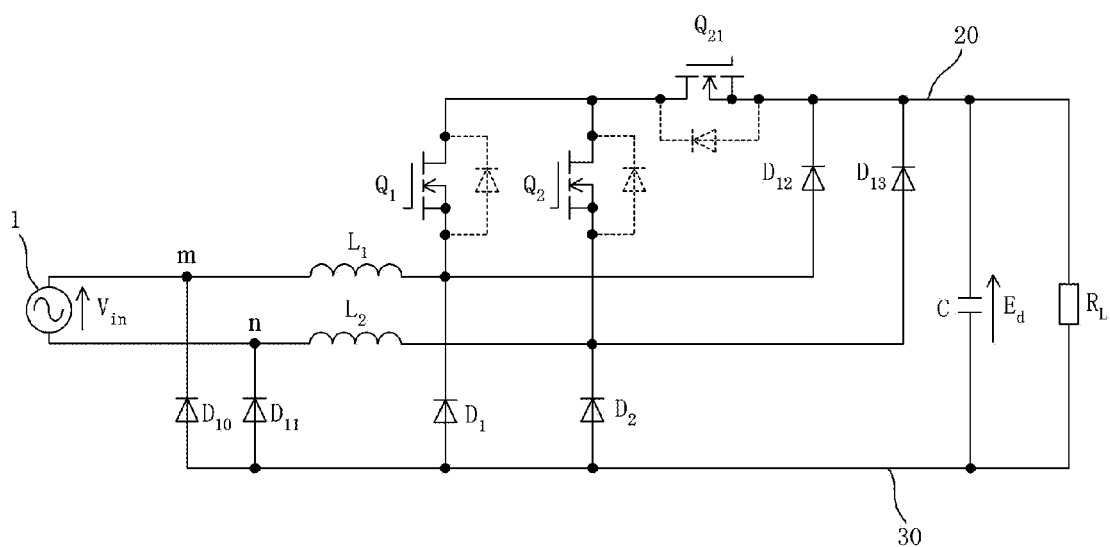
FIG. 4 is a circuit diagram showing a rectifier circuit as an example of a modification of the rectifier circuit of the example 2 shown in FIG. 3.

FIG. 4 is a circuit diagram showing a rectifier circuit as an example of a modification of the rectifier circuit of the example 2 shown in FIG. 3. In the circuit shown in FIG. 4, polarities of the switching devices in the example 2 shown in FIG. 3 are made reversed. Namely, one end of the AC power supply 1 is connected to the connection point of the MOSFET $Q_1$ and the fast recovery diode $D_1$ through the inductor $L_1$ and the other end of the AC power supply 1 is connected to the connection point of the MOSFET $Q_2$ and the fast recovery diode $D_2$ through the inductor $L_2$. The drains of the MOSFETs $Q_1$ and $Q_2$ are connected to the drain of the MOSFET $Q_{21}$. The source of the MOSFET $Q_{21}$ is connected to the first DC line 20. Between the source of the MOSFET $Q_{21}$ and the connection point of the MOSFET $Q_1$ and the fast recovery diode $D_1$, the slow recovery diode $D_{12}$ is connected and, between the source of the MOSFET $Q_{21}$ and the connection point of the MOSFET $Q_2$ and the fast recovery diode $D_2$, the slow recovery diode $D_{13}$ is connected.

Moreover, between a connection point m, at which one end of the AC power supply 1 and one end (a first end) of the inductor $L_1$ is connected, and the second DC line 30, a slow recovery diode $D_{10}$ is connected. Between a connection point n, at which the other end of the AC power supply 1 and one end (a first end) of the inductor $L_2$ is connected, and the second DC line 30, a slow recovery diode $D_{11}$ is connected. In addition, for the fifth diodes $D_{12}$ and $D_{13}$, slow recovery diodes having forward surge current capabilities higher than those of the first diodes $D_1$ and $D_2$, respectively, are used.

It is needless to say that even in thus formed modification of the example 2, a similar advantage to that of the example 2 can be obtained.

Example 3

Figure 5:
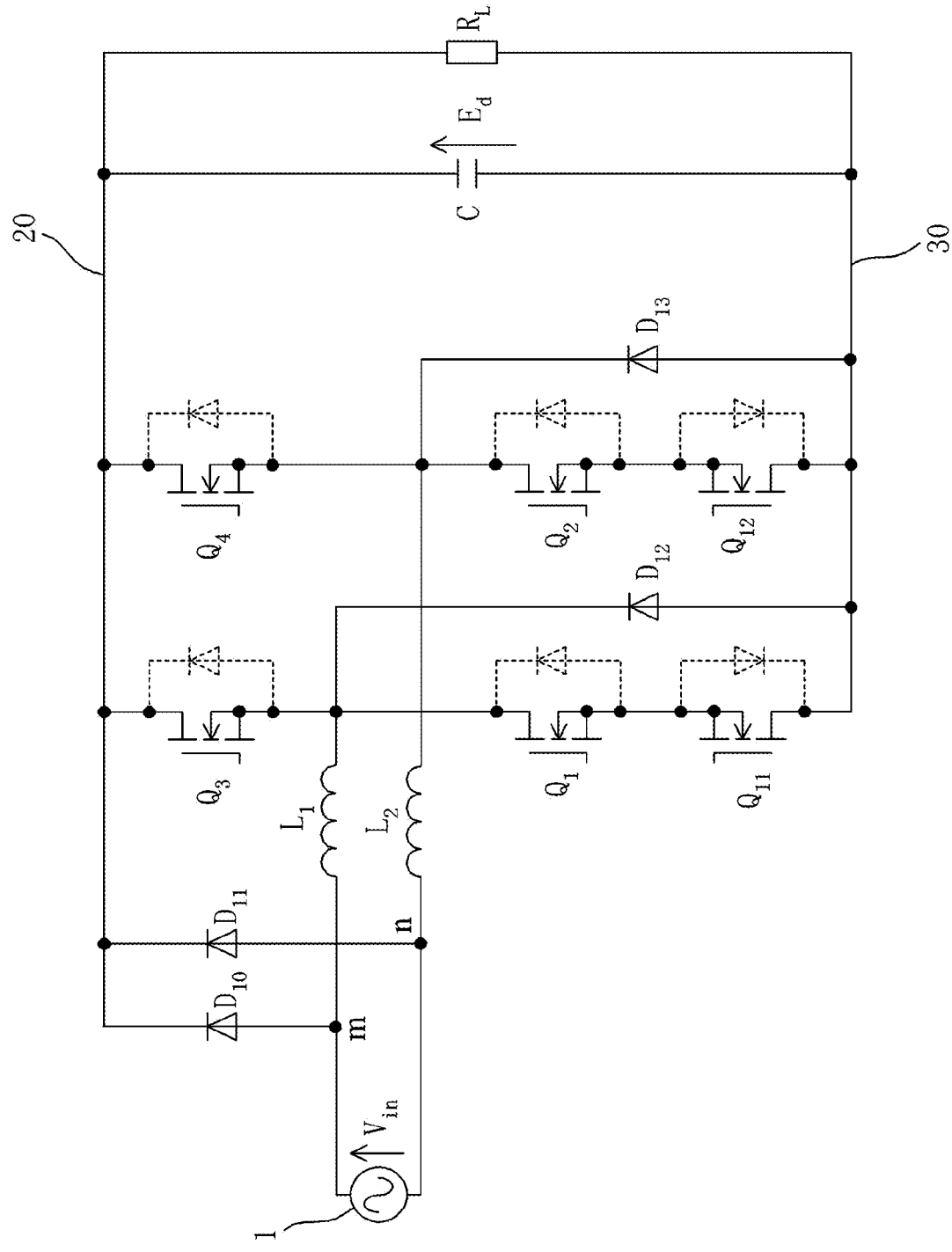
FIG. 5 is a circuit diagram showing a rectifier circuit according to an example 3 of the invention.

FIG. 5 is a circuit diagram showing a rectifier circuit according to an example 3 of the invention. The difference between the example 3 shown in FIG. 5 and the example 1 shown in FIG. 1 is that the fast recovery diodes $D_1$ and $D_2$ in the example 1 are substituted by MOSFETs $Q_3$ and $Q_4$ (third semiconductor switches), respectively, each having a diode (sixth diode) connected in inverse parallel thereto.

An explanation will be made with respect to the operation of thus formed rectifier circuit according to the example 3 of the invention.

At a normal operation, the MOSFETs $Q_{11}$ and $Q_{12}$ are constantly made turned-on by a gate controller not shown. While, the MOSFETs $Q_1$ and $Q_2$ are subjected to switching at a fast recovery by the gate controller. Thus, an input current inputted from the AC power supply 1 and a DC output voltage outputted from the rectifier circuit are controlled. Here, suppose that the MOSFET $Q_1$ is made turned-on by the gate controller in a period in which the polarity of the voltage $V_{in}$ of the AC power supply 1 is positive, for example. Then, a current increases which flows along a path of the AC power supply 1→the inductor $L_1$→the MOSFET $Q_1$→the MOSFET $Q_{11}$→the MOSFET $Q_{12}$→a body diode of the MOSFET $Q_2$ (illustrated with a broken line)→the inductor $L_2$→the AC power supply 1. At this time, energy is stored in each of the inductors $L_1$ and $L_2$.

Next, with the MOSFET $Q_1$ made turned-off and the MOSFET $Q_3$ made turned-on by the gate controller, a current decreases which flows along a path of the inductor $L_1$→the body diode of the MOSFET $Q_3$→the capacitor C→the MOSFET $Q_{12}$→the body diode of the MOSFET $Q_2$→the inductor $L_2$→the AC power supply 1→the inductor $L_1$. At this time, the energy stored in each of the inductor $L_1$ and $L_2$ is supplied to the load side.

Also in a period in which the polarity of the voltage $V_{in}$ of the AC power supply 1 is negative, the symmetry of the circuit results in a similar operation by making the MOSFETs $Q_2$ and $Q_3$ turned-on and -off. In this way, the rectifier circuit shown in FIG. 5 can control an input current and an output voltage with the gate controller adequately controlling the MOSFETs $Q_1$ to $Q_4$ like in the related rectifier circuit shown in FIG. 19.

Moreover, with the MOSFETs $Q_3$ and $Q_4$ made to perform switching operations, the energy stored in the road $R_L$ can be transferred to the AC power supply 1 for regeneration. Therefore, when a device such as a motor is connected as a load through an inverter, the energy generated in the load can be made regenerated for enabling power loss reduction.

Furthermore, at turning-on the power or at recovery from a power interruption, in the case in which, for example, the voltage $V_{in}$ of the AC power supply 1 becomes higher than the voltage of the capacitor C with the polarity of the voltage $V_{in}$ of the AC power supply 1 being positive, the gate controller turns off the MOSFETs $Q_3$, $Q_4$, $Q_{11}$ and $Q_{12}$. Then, an inrush current flows in a path of the AC power supply 1→the slow recovery diode $D_{10}$→the capacitor C→the slow recovery diode $D_{13}$→the inductor $L_2$→the AC power supply 1. Therefore, no inrush current flows in the MOSFETs $Q_2$ and $Q_3$ each having low forward surge current capability. That is, the rectifier circuit according to the invention can make an inrush current bypass the MOSFETs $Q_2$ and $Q_3$ with the use of the slow recovery diodes $D_{10}$ and $D_{13}$.

Similarly, when an inrush current flows in a period in which the polarity of the voltage $V_{in}$ of the AC power supply 1 is negative, the gate controller turns off the MOSFETs $Q_3$, $Q_4$, $Q_{11}$ and $Q_{12}$. Then, like in the explanations in the foregoing, the inrush current flows in the slow recovery diodes $D_{11}$ and $D_{12}$ and no excessive current flows in each of the MOSFETs $Q_1$ and $Q_4$.

In this way, the rectifier circuit according to the invention makes an inrush current flow in the slow recovery diodes with high forward surge current capabilities to bypass the MOSFETs $Q_1$ to $Q_4$ to enable the rectifier circuit to be operated safely without damaging the switching devices and the fast recovery diodes.

Example 4

Figure 6:
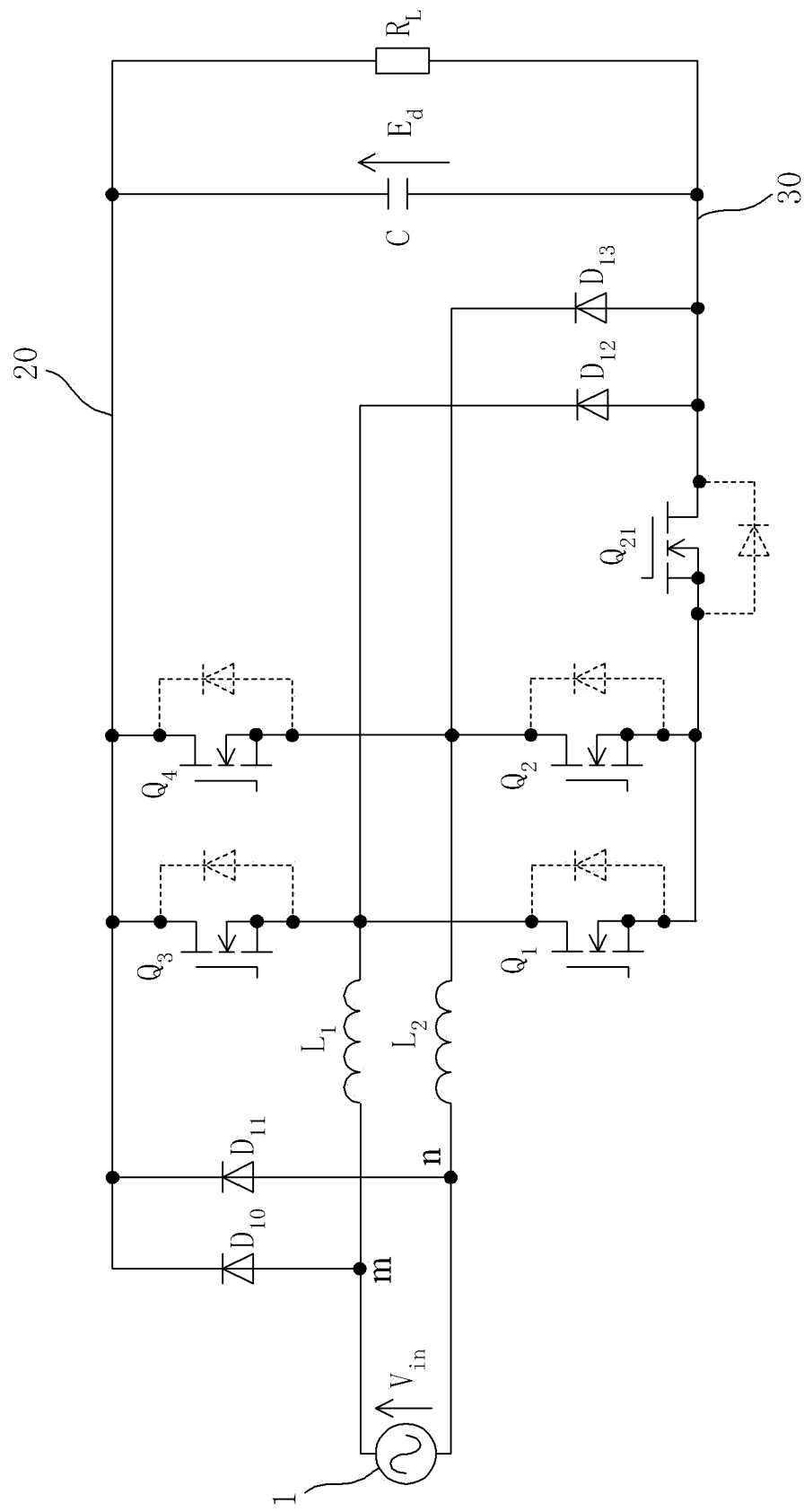
FIG. 6 is a circuit diagram showing a rectifier circuit according to an example 4 of the invention.

FIG. 6 is a circuit diagram showing a rectifier circuit according to an example 4 of the invention. The difference between the example 4 shown in FIG. 6 and the example 2 shown in FIG. 3 is that the fast recovery diodes $D_1$ and $D_2$ in the example 2 are substituted by MOSFETs $Q_3$ and $Q_4$ (third semiconductor switches), respectively, each having a diode (sixth diode) connected in inverse parallel thereto.

Also in thus formed rectifier circuit according to the example 4, although the explanation thereof will be omitted, by carrying out control similar to that carried out in the above explained examples 2 and 3, an inrush current is made to flow in the slow recovery diodes with high forward surge current capabilities to bypass the MOSFETs $Q_1$ to $Q_4$ to enable the rectifier circuit to be operated safely without damaging the switching devices.

In the example 4, the sources of the three MOSFETs $Q_1$, $Q_2$ and $Q_{21}$ are made to be equipotential. This allows the three MOSFETs $Q_1$, $Q_2$ and $Q_{21}$ to be driven by a gate driving circuit at an electric potential common to those of the three MOSFETs, by which the gate driving circuit can be downsized at lowered cost.

Example 5

Figure 7:
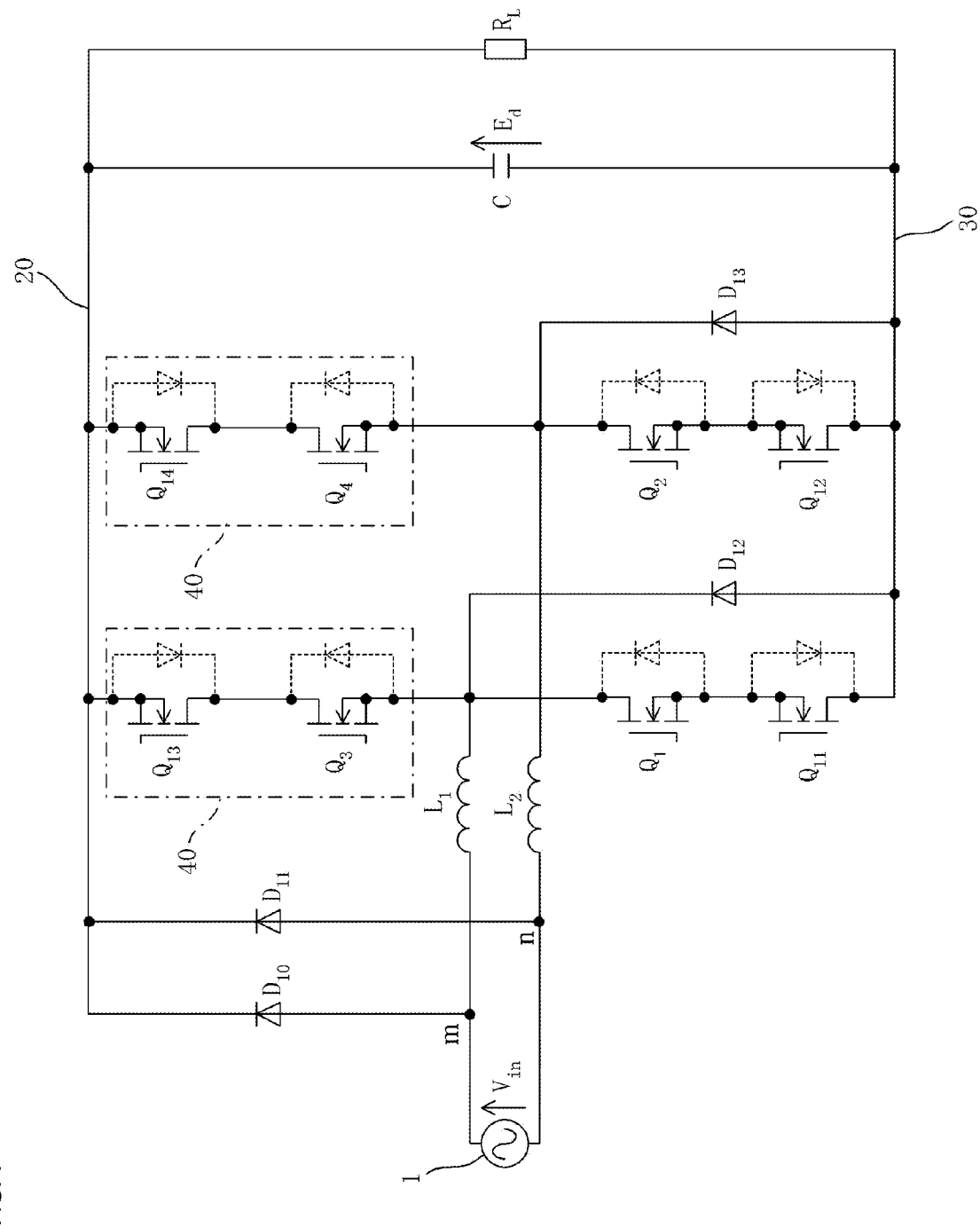
FIG. 7 is a circuit diagram showing a rectifier circuit according to an example 5 of the invention.

FIG. 7 is a circuit diagram showing a rectifier circuit according to an example 5 of the invention. The difference between the example 5 shown in FIG. 7 and the example 1 explained before is that the first diodes $D_1$ and $D_2$ (fast recovery diodes) in the example 1 are substituted by providing second series circuits 40. The second series circuit 40 is provided with a MOSFET ($Q_3$, $Q_4$; a third semiconductor switching device) with a diode (a sixth diode) connected in inverse parallel thereto and a MOSFET ($Q_{13}$, $Q_{14}$; a fourth semiconductor switching device) with a diode (a seventh diode) connected in inverse parallel thereto, and the third semiconductor switching device and the fourth semiconductor switching device are connected in series so that the directions of conduction of the sixth and seventh diodes become opposite to each other.

Also in thus formed rectifier circuit according to the example 5, a gate controller not shown carries out control similar to that in the examples 1 and 3 explained before so that the MOSFETs $Q_{11}$ to $Q_{14}$ are made turned-on normally and the MOSFETs $Q_{11}$ to $Q_{14}$ are made turned-off when an inrush current flows in the capacitor C, by which an advantage like those in the examples 1 and 3 can be obtained.

Figure 8:
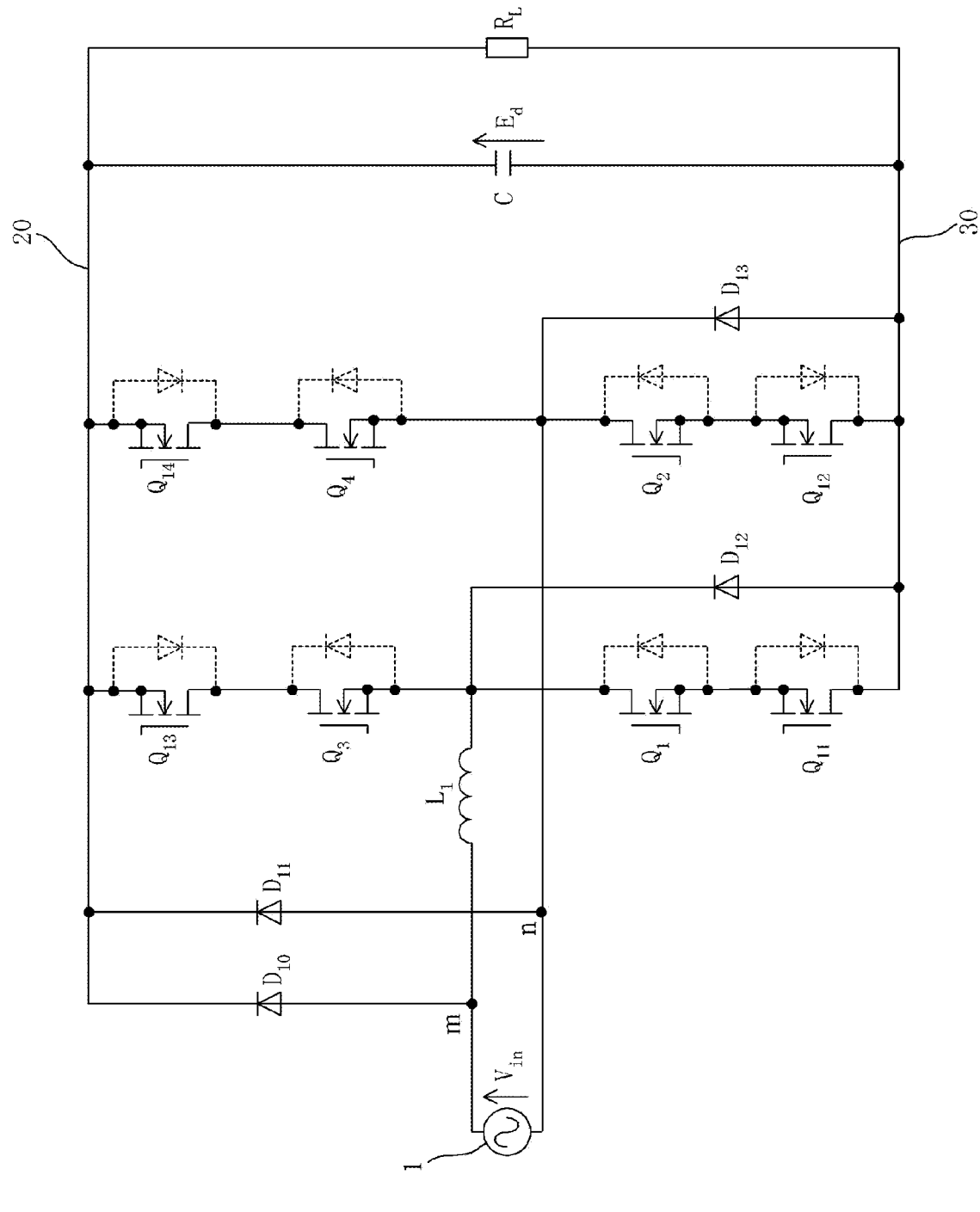
FIG. 8 is a circuit diagram showing a rectifier circuit as an example of a modification of the rectifier circuit of the example 5 shown in FIG. 7.

The example 5 can also be actualized with a modification as shown in FIG. 8. The modification of the example 5 is provided as a rectifier circuit in which one inductor $L_2$ is removed which is provided in a section from the AC power supply 1 to one connection point of the first and second series circuits. Also in the modified example, an inrush current is made to flow in the slow recovery diodes with high forward surge current capabilities to bypass the MOSFETs $Q_1$ to $Q_4$ to enable the rectifier circuit to be operated safely without damaging the switching devices.

Example 6

Figure 9:
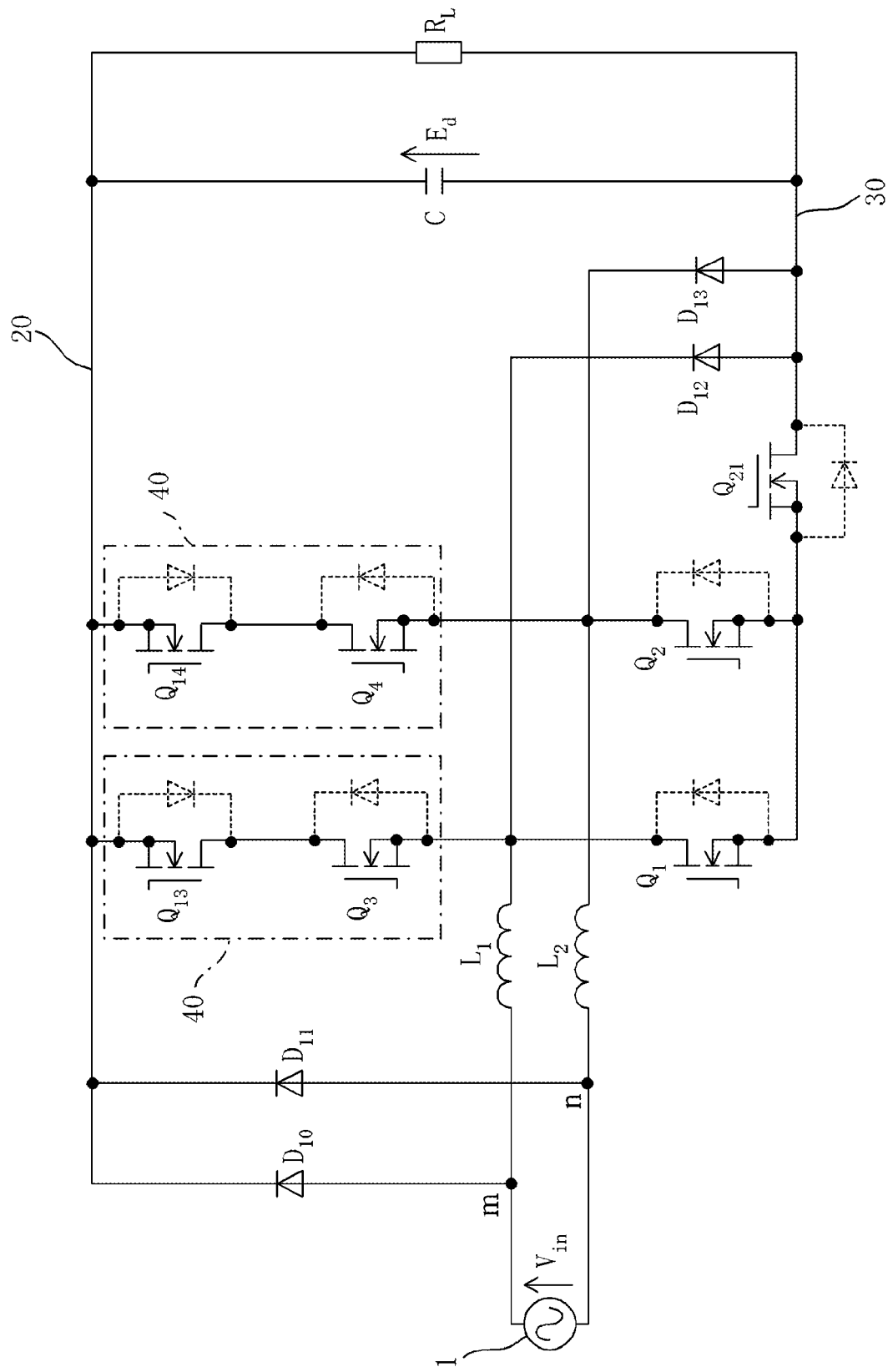
FIG. 9 is a circuit diagram showing a rectifier circuit according to an example 6 of the invention.

FIG. 9 is a circuit diagram showing a rectifier circuit according to an example 6 of the invention. The difference between the example 6 shown in FIG. 9 and the example 2 explained before is that the fast recovery diodes $D_1$ and $D_2$ (first diodes) in the example 2 are substituted by providing second series circuits 40. With respect to the second series circuit 40, it is similar to that in the example 5 explained before. Thus, the explanation thereof will be omitted.

Also in thus formed rectifier circuit according to the example 6, though an explanation will be omitted, by carrying out control similar to that in the examples 2, 4 and 5 explained before, an advantage like those in the examples can be obtained.

Figure 10:
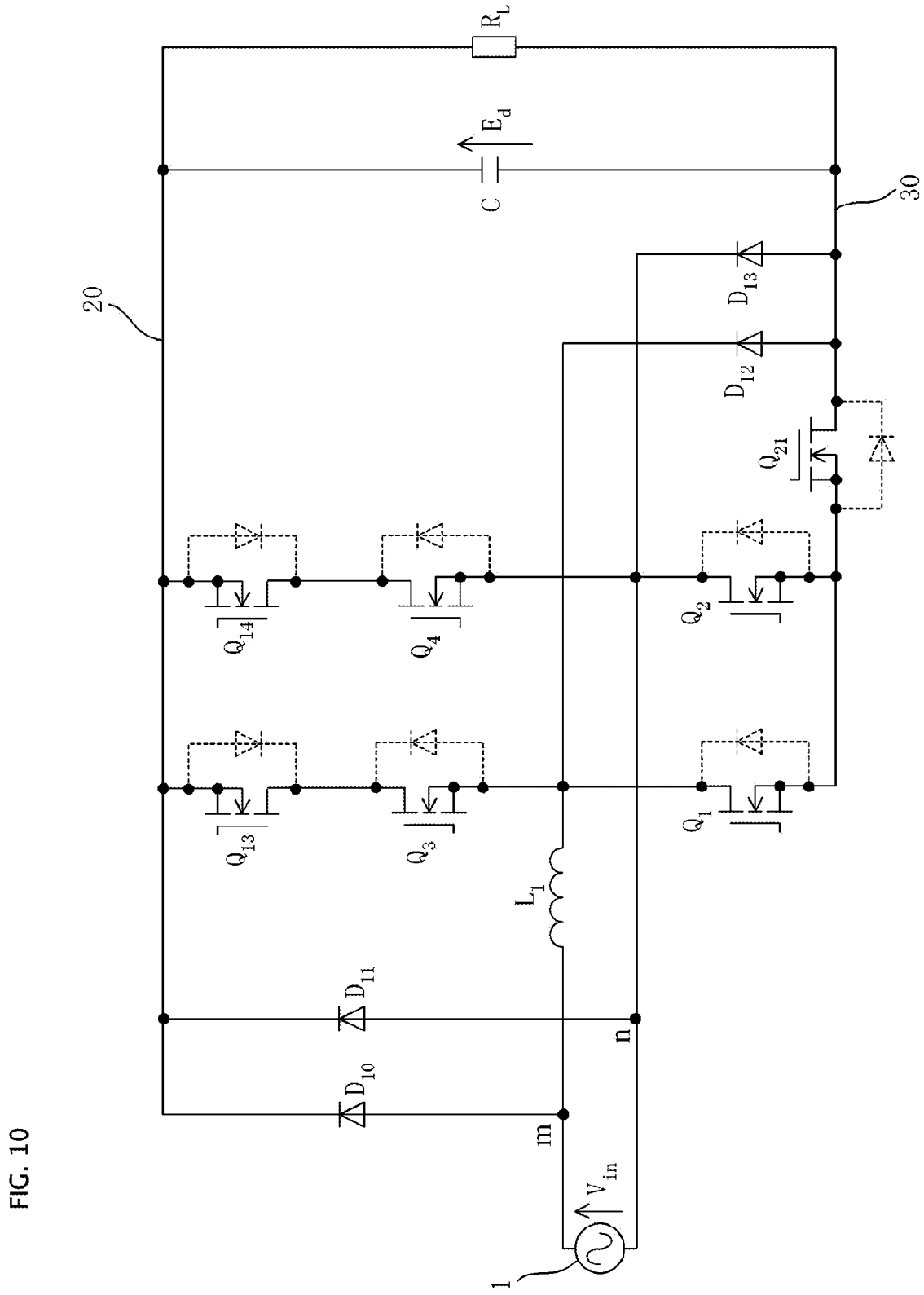
FIG. 10 is a circuit diagram showing a rectifier circuit as an example of a modification of the rectifier circuit of the example 6 shown in FIG. 9.

The example 6 can also be actualized with a modification as shown in FIG. 10. The modification of the example 6 is a rectifier circuit in which one inductor $L_2$ is removed which is provided in a section from the AC power supply 1 to the second series circuit. Also in the modified example, an inrush current is made to flow in the slow recovery diodes with high forward surge current capabilities to bypass the MOSFETs $Q_1$ to $Q_4$ to enable the rectifier circuit to be operated safely without damaging the switching devices.

Moreover, as is shown in FIGS. 9 and 10, in the example 6, the sources of the three MOSFETs $Q_1$, $Q_2$ and $Q_{21}$ are made to be equipotential. This allows the three MOSFETs $Q_1$, $Q_2$ and $Q_{21}$ to be driven by a gate driving circuit at an electric potential common to those of the three MOSFETs, by which the gate driving circuit can be downsized at lowered cost.

Example 7

Figure 11:
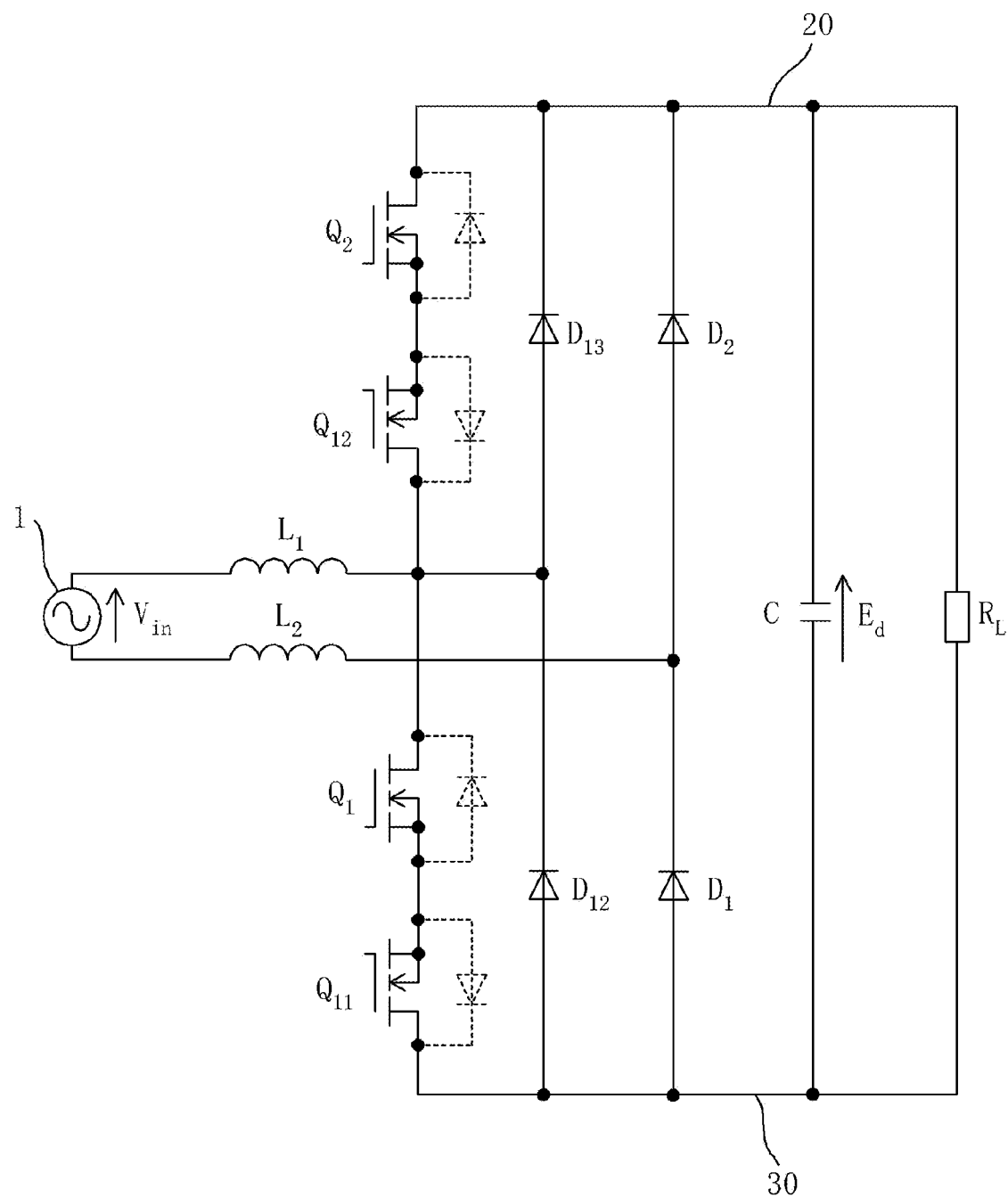
FIG. 11 is a circuit diagram showing a rectifier circuit according to an example 7 of the invention.

FIG. 11 is a circuit diagram showing a rectifier circuit according to an example 7 of the invention. The circuit is provided with a bridge circuit formed of four diodes. The bridge circuit includes a series circuit of two slow recovery diodes $D_1$ and $D_2$ and a series circuit of two slow recovery diodes $D_{12}$ and $D_{13}$. Between the connection point of the slow recovery diodes $D_{12}$ and $D_{13}$ in the one series circuit of the bridge circuit and the one end of the AC power supply 1, an inductor $L_1$ is inserted. While, between the connection point of the slow recovery diodes $D_1$ and $D_2$ in the other series circuit of the bridge circuit and the other end of the AC power supply 1, an inductor $L_2$ is inserted. Moreover, between the first DC line 20 and the second DC line 30, in each of which a DC current outputted from the bridge circuit flows, a smoothing capacitor C is connected. A DC voltage $E_d$ obtained across the capacitor C is supplied to the load side.

The rectifier circuit is further provided with two series circuits. In one of them, a first semiconductor switching device MOSFET $Q_1$ with a diode connected in inverse parallel thereto and a second semiconductor switching device MOSFET $Q_{11}$ with a diode connected in inverse parallel thereto are connected in series. In the other one, a first semiconductor switching device MOSFET $Q_2$ with a diode connected in inverse parallel thereto and a second semiconductor switching device MOSFET $Q_{12}$ with a diode connected in inverse parallel thereto are connected in series. To the two series circuits, the previously explained slow recovery diodes $D_{12}$ and $D_{13}$ are connected in parallel, respectively. The two series circuits are further connected in series and, to the connection point, the other end of the inductor $L_1$, whose one end is connected to the AC power supply 1, is connected.

An explanation will be made with respect to the operation of thus formed rectifier circuit according to the example 7 of the invention.

At a normal operation, the MOSFETs $Q_{11}$ and $Q_{12}$ are constantly made turned-on by a gate controller not shown. While, the MOSFETs $Q_1$ and $Q_2$ are subjected to switching at a fast recovery by the gate controller not shown. Thus, an input current inputted from the AC power supply 1 and a DC output voltage outputted from the rectifier circuit are controlled.

Here, suppose that the MOSFET $Q_1$ is made turned-on by the gate controller in a period in which the polarity of the voltage $V_{in}$ of the AC power supply 1 is positive, for example. Then, a current increases which flows along a path of the AC power supply 1→the inductor $L_1$→the MOSFET $Q_1$→the MOSFET $Q_{11}$→the slow recovery diode $D_1$→the inductor $L_2$→the AC power supply 1. At this time, energy is stored in each of the inductors $L_1$ and $L_2$.

Next, with the MOSFET $Q_1$ made turned-off and the MOSFET $Q_3$ made turned-on by the gate controller, a current decreases which flows along a path of the inductor $L_1$→the MOSFET $Q_{12}$→the MOSFET $Q_2$→the capacitor C→the slow recovery diode $D_1$→the inductor $L_2$→the AC power supply 1→the inductor $L_1$. At this time, the energy stored in each of the inductor $L_1$ and $L_2$ is supplied to the load side.

Also in a period in which the polarity of the voltage $V_{in}$ of the AC power supply 1 is negative, the symmetry of the circuit results in a similar operation by making the MOSFETs $Q_1$ and $Q_2$ turned-on and -off. That is, the rectifier circuit shown in FIG. 11 can control an input current and an output voltage with the gate controller adequately controlling the MOSFETs $Q_1$ and $Q_4$ like in the related rectifier circuit shown in FIG. 19.

Furthermore, at turning-on the power or at recovery from a power interruption, in the case in which, for example, the voltage $V_{in}$ of the AC power supply 1 becomes higher than the voltage of the capacitor C with the polarity of the voltage $V_{in}$ of the AC power supply 1 being positive, the gate controller turns off the MOSFETs $Q_{11}$ and $Q_{12}$. Then, an inrush current flows in a path of the AC power supply 1→the inductor $L_1$→the slow recovery diode $D_{13}$→the capacitor C→the slow recovery diode $D_1$→the inductor $L_2$→the AC power supply 1. Therefore, no inrush current flows in the MOSFET $Q_2$ having low forward surge current capability. That is, the rectifier circuit according to the invention can make an inrush current bypass the MOSFET $Q_2$ with the use of the slow recovery diodes $D_1$ and $D_{13}$.

Similarly, also in a period in which the polarity of the voltage $V_{in}$ of the AC power supply 1 is negative, an inrush current flows in the slow recovery diodes $D_2$ and $D_{12}$ and no excessive current flows in the MOSFET $Q_1$.

Example 8

Figure 12:
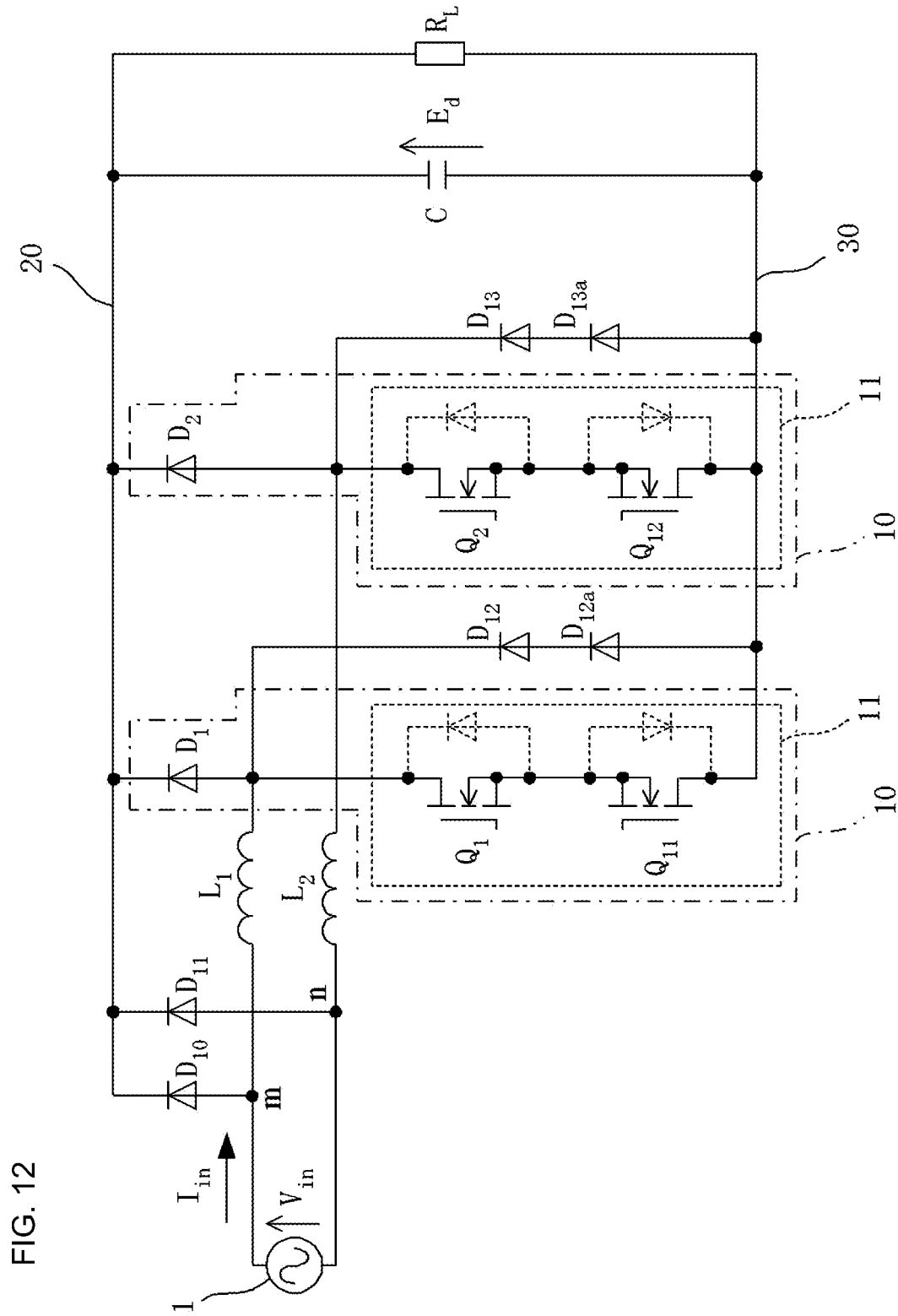
FIG. 12 is a circuit diagram showing a rectifier circuit according to an example 8 of the invention.

FIG. 12 is a circuit diagram showing a rectifier circuit according to an example 8 of the invention. The difference between the example 8 and the example 1 explained before is that each fifth diode is formed with two diodes ($D_{12}$ and $D_{12a}$, $D_{13}$ and $D_{13a}$) connected in series instead of the one fifth diode ($D_{12}$, $D_{13}$).

Thus formed rectifier circuit according to the example 8 is also operated as was explained with respect to that of the example 1.

Here, in each of the diodes forming the fifth diodes ($D_{12}$ and $D_{12a}$, and $D_{13}$ and $D_{13a}$), generally causes a low voltage drop in the forward direction. Therefore, a part of a current flowing from the MOSFET $Q_{11}$ to the MOSFET $Q_{12}$ or a part of a current flowing from the capacitor C to the MOSFET $Q_{12}$ is diverted to the fifth diode ($D_{13}$ and $D_{13a}$), or a part of a current flowing from the MOSFET $Q_{12}$ to the MOSFET $Q_{11}$ or a part of a current flowing from the capacitor C to the MOSFET $Q_{11}$ is diverted to the fifth diode ($D_{12}$ and $D_{12a}$). In the example 8, as shown in FIG. 12, two of the slow recovery diodes are connected in series to increase a forward voltage drop in the series connected diodes, by which an amount of diverted current in a normal operation of the rectifier circuit can be made sufficiently reduced or reduced to zero.

Furthermore, to the slow recovery diode, a device with a small current capacity (for example, a miniature and low-priced device such as a device for surface mounting) can be applied, by which a system can be made smaller and cost-reduced compared with the case of using one diode with a large current capacity. Moreover, since a slow recovery diode produces no loss in a normal operation, no provision of cooling means becomes necessary.

Therefore, in the rectifier circuit according to the example 8, the capacity of the fifth diode can be made smaller compared with that in the example 1 to enable the power supply circuit to be downsized and cost-reduced.

In addition, the number of the slow recovery diodes is not limited to be two, but three or more diodes can be connected in series.

Moreover, the configuration with a plurality of slow recovery diodes connected in series is similarly advantageous also in each of the circuits of the examples 2 to 7 (since the advantages are similar, the explanations thereof will be omitted).

Example 9

Figure 13:
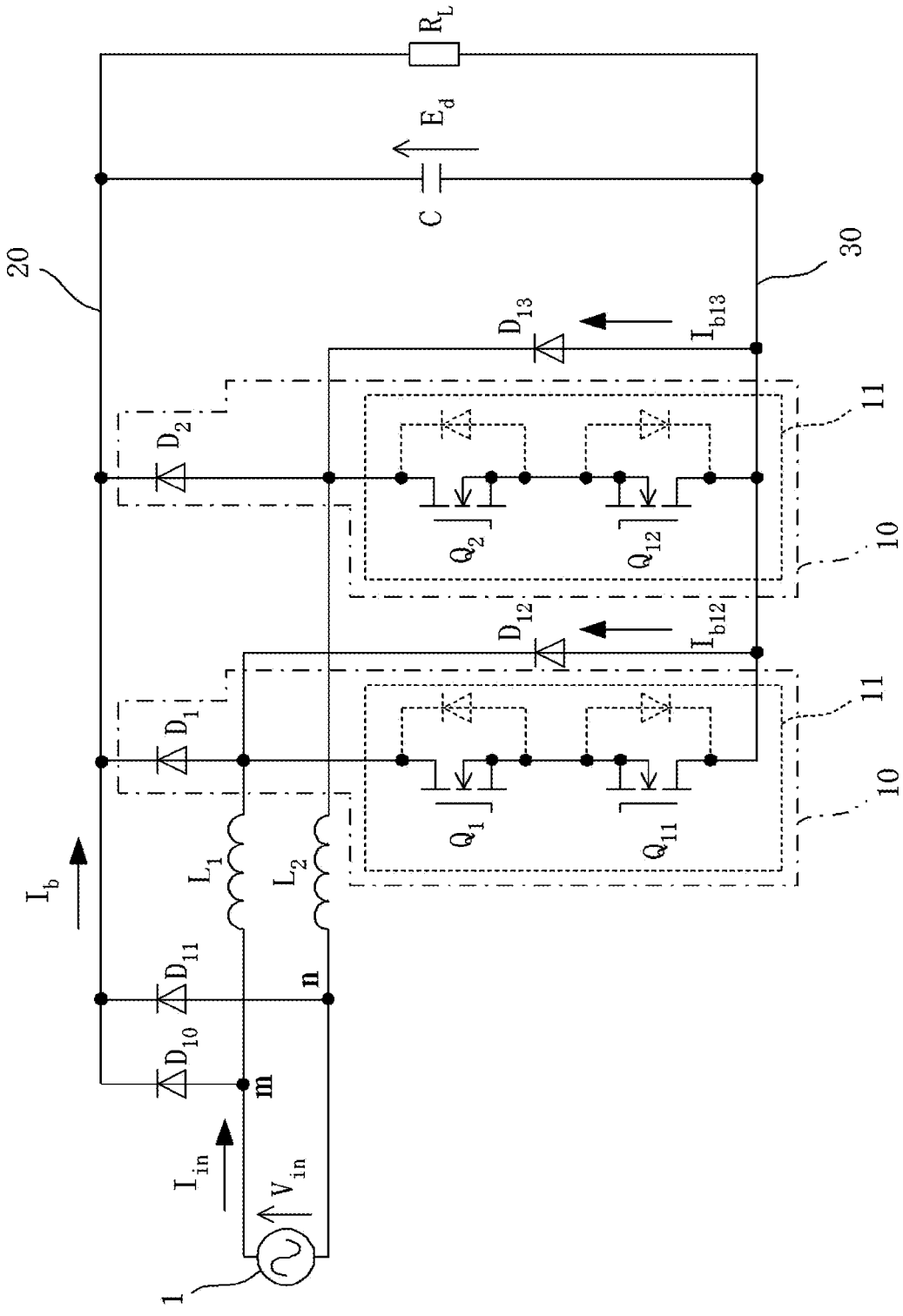
FIG. 13 is a circuit diagram showing a rectifier circuit according to an example 9 of the invention.

FIG. 13 is a circuit diagram showing a rectifier circuit according to an example 9 of the invention. The difference between the example 9 and the example 1 explained before is that against an inrush current produced at turning-on the power or at recovery from a power interruption, a current flowing into the series circuit 10 is made limited.

Figure 14:
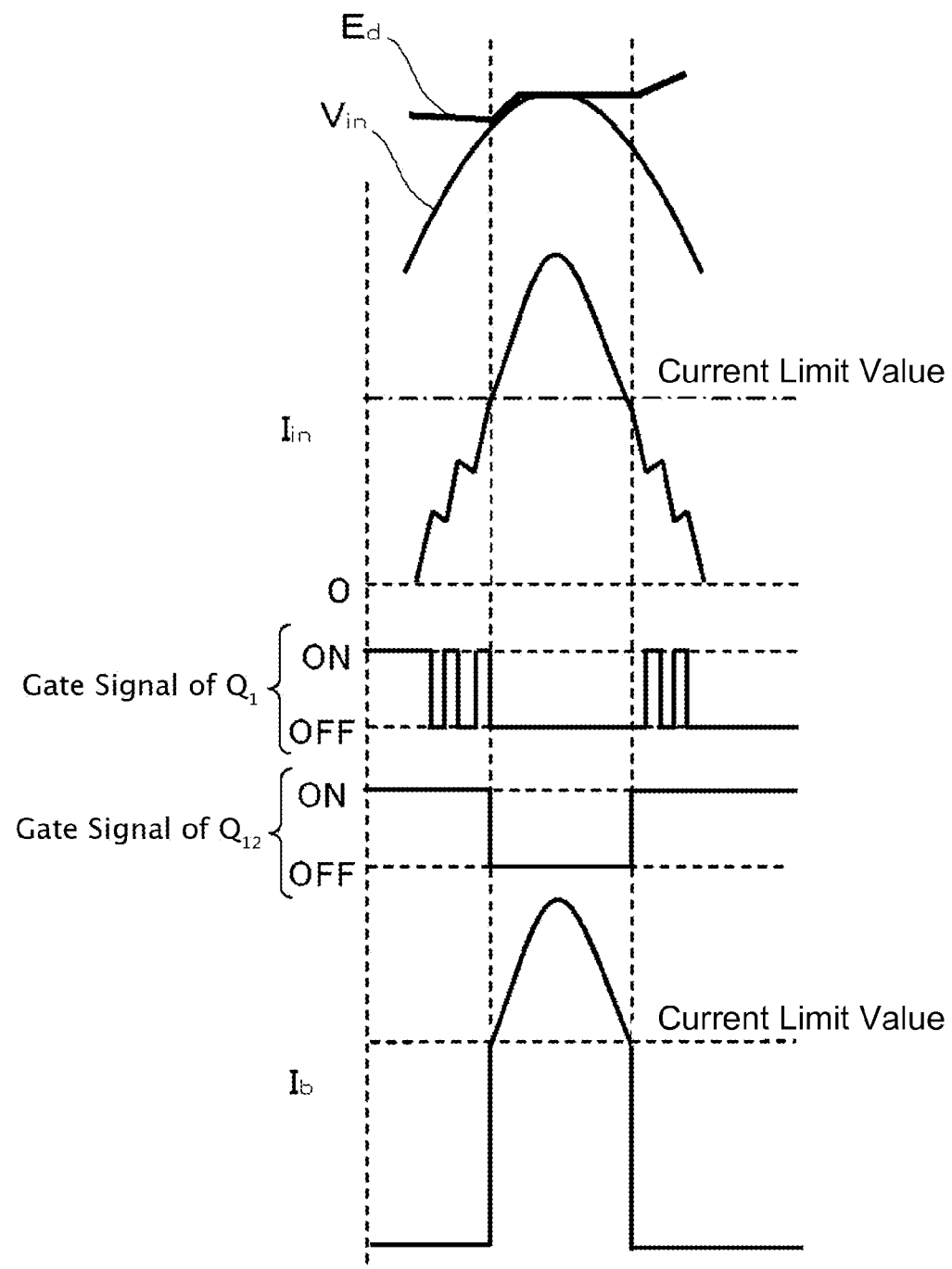
FIG. 14 is a diagram for explaining the operation of the rectifier circuit according to the example 9 of the invention.

With respect to the operation of the rectifier circuit according to the example 9 of the invention, an explanation will be made by using FIG. 14. As was explained before, for making no inrush current flow in the slow recovery diodes $D_1$ and $D_2$ and MOSFETs $Q_1$ and $Q_2$, not only are the MOSFETs $Q_{11}$ and $Q_{12}$ made turned-off, but also the MOSFETs $Q_1$ and $Q_2$ can be made turned-off.

While, with the MOSFET $Q_1$ or the MOSFET $Q_2$ made turned-on when an inrush current is flowing, a current having been flowing in the slow recovery diode $D_{10}$ or $D_{11}$ commutates to the MOSFET $Q_1$ or the MOSFET $Q_2$. For example, suppose that the MOSFET $Q_1$ is made turned-on in a period in which the polarity of the voltage $V_{in}$ of the AC power supply 1 is positive with the MOSFET $Q_{11}$ and the MOSFET $Q_{12}$ being made turned-off. Then, a current flows along a path of the AC power supply 1→the inductor $L_1$→the MOSFET $Q_1$→a body diode of the MOSFET $Q_{11}$ (illustrated with a broken line)→the slow recovery diode $D_{13}$→the inductor $L_2$→the AC power supply 1 to increase further.

In such a case that the current flowing into the series circuit 10 exceeds a specified value, the gate controller also turns-off the MOSFETs $Q_1$ and $Q_2$ and, for preventing switching devices (including body diodes) and fast recovery diodes with low forward surge current capabilities from being damaged by inrush currents, controls the gates of the devices so as to make the devices turned-off. Then, the inrush current flows along the path of the AC power supply 1→the slow recovery diode $D_{10}$→the capacitor C→the inductor $L_2$→the AC power supply 1 (in the case of being in a period in which the polarity of the input voltage is positive as was explained before).

With the rectifier circuits thus formed and controlled, no current with a specified value or more flows in the fast recovery diode $D_1$ and the MOSFET $Q_2$ having low forward surge current capabilities. Similarly, also in a period in which the polarity of the voltage $V_{in}$ of the AC power supply 1 is negative, an inrush current flows in the slow recovery diodes $D_{11}$ and $D_{12}$ and no current with a specified value or more flows in the fast recovery diode $D_2$ and the MOSFET $Q_1$.

While, when charging of the capacitor C by the AC power supply 1 is completed and the inrush current becomes small, the circuit quickly returns to a normal operation. Specifically, when the value of an inrush current is a specified value or less, the gate controller turns-on the MOSFETs $Q_{11}$ and $Q_{12}$ again to adequately drive the MOSFETs $Q_1$ and $Q_2$ to thereby control an input current and an output voltage.

The determination of an inrush current is carried out by detecting a current flowing in the bypass circuit explained before. Specifically, a current flowing between the drain and the source (between main circuit terminals) of each of the MOSFETs $Q_1$ and $Q_2$ can be detected by a device such as a current detector (current transformer; CT) not shown to be used for controlling an input current. In such a case, an ordinary configuration of detecting the current $I_{in}$ of the AC power supply 1 requires an ACCT with a large core for causing no magnetic saturation at the frequency of the AC power supply 1 (the normal frequency such as 50 Hz or 60 Hz). Compared with this, in the configuration of detecting the current flowing between the drain and the source of each of the MOSFETs $Q_1$ and $Q_2$, the switching operations of the MOSFETs $Q_1$ and $Q_2$ are carried out with an electric current flowing between the drain and the source with frequencies ranging from tens of kilohertz to 100 kHz to cause no magnetic saturation even with the use of a small core. Thus, in the example 9, the ACCT can be downsized with reduced component costs.

Incidentally, current detection requires the MOSFETs $Q_1$ and $Q_2$ to be made turned-on. Thus, the turning-on of the MOSFETs $Q_1$ and $Q_2$ when an inrush current is flowing causes the inrush current to commutate from a bypass circuit to the MOSFETs $Q_1$ and $Q_2$ as was explained before. Therefore, for making the rectifier circuit return to a normal operation while limiting a current flowing in the series circuit 10, it is necessary to detect the current flowing in the bypass circuit and determine whether or not the value of the detected current is equal to or less than a certain value. Thus, the current $I_b$, $I_{b12}$ or $I_{b13}$ (shown in FIG. 13) is made detected by a device such as a current transformer (ACCT) and, when the value of the detected current becomes equal to or less than a certain value, the rectifier circuit is made to return to carry out a normal operation. Since only a current that lasts in a short period like an inrush current flows in the bypass circuit, an ACCT with a small size and a low cost can be used for inrush current detection. For carrying out input current control at a normal operation, a current flowing between the drain and the source of each of the MOSFETs $Q_1$ and $Q_2$ is used.

In this way, the rectifier circuit according to the invention makes an inrush current flow in a slow recovery diode with a high forward surge current capability to bypass switching devices and fast recovery diodes with low forward surge current capabilities, by which the switching devices can be safely operated without being damaged. Moreover, also in the case when an inrush current becomes low, the rectifier circuit is able to return to a normal operation safely and quickly.

The configuration explained above is not limited to that for the circuit shown in FIG. 1, but similar advantages are obtained also in the circuits shown as the examples 2 to 7 (since the advantages are the same, the explanations thereof will be omitted).

Figure 15:
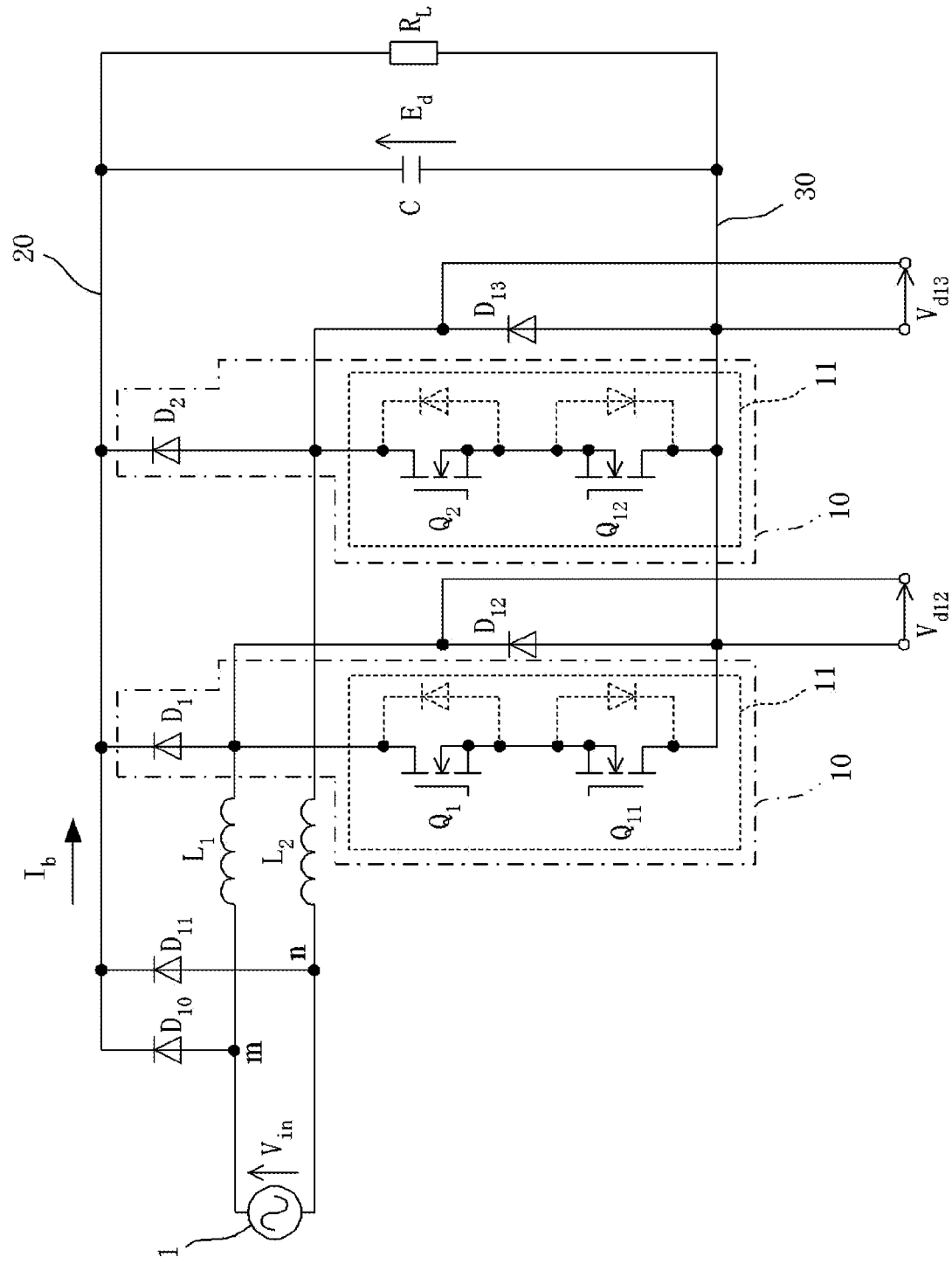
FIG. 15 is a circuit diagram showing a rectifier circuit according to an example 10 of the invention.

FIG. 15 is a circuit diagram showing a rectifier circuit according to an example 10 of the invention. The difference between the example 10 and the above explained example 9 is that a first voltage detector (not shown) is provided which determines an inrush current $I_b$ flowing into bypass circuits by anode-cathode voltages $V_{d12}$ and $V_{d13}$ of the fifth diodes $D_{12}$ and $D_{13}$, respectively.

Figure 16:
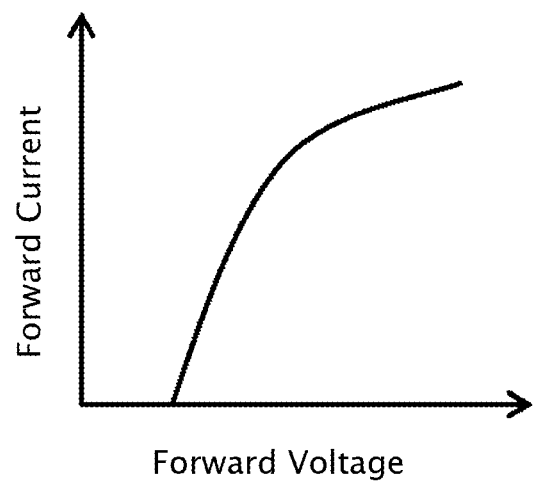
FIG. 16 is a diagram showing a forward voltage to forward current characteristic of a typical diode.

In general, the forward voltage of a diode has a characteristic that increases with an increase in the amount of a forward current as shown in FIG. 16. Therefore, the value of a current can be estimated from the value of a forward voltage. However, the value of the forward voltage of a diode has temperature dependence and variation depending on individual parts, which makes it difficult to accurately estimate a conducting current value from a forward voltage value.

Nevertheless, determination whether an excessive current like an inrush current at turning-on the power is flowing or not requires no high current detecting accuracy. The example 10 was made by giving attention to this point to make it possible to prevent switching devices from being damaged while making the rectifier circuit downsized at a low cost without providing additional parts such as an ACCT having a role of current detection as was explained in the example 9.

The configuration explained above is not limited to that for the circuit shown in the example 10, but similar advantages are obtained also in the circuits shown as the examples 2 to 6 (since the advantages are the same, the explanations thereof will be omitted).

Example 11

Figure 17:
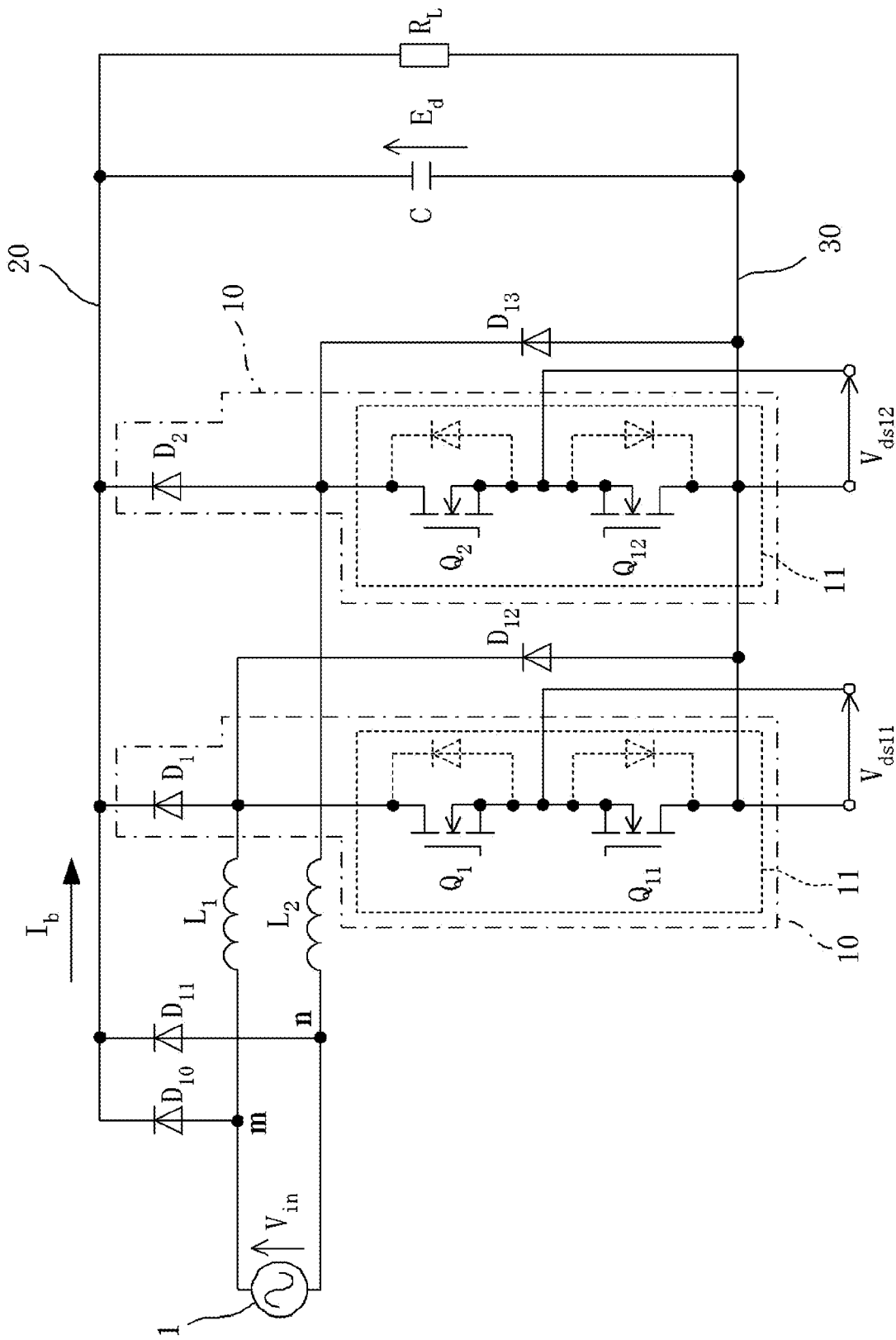
FIG. 17 is a circuit diagram showing a rectifier circuit according to an example 11 of the invention.

FIG. 17 is a circuit diagram showing a rectifier circuit according to an example 11 of the invention. The difference between the example 11 and the above explained example 9 is that a second voltage detector (not shown) is provided which determines an inrush current $I_b$ flowing into bypass circuits by drain-source voltages $V_{ds11}$ and $V_{ds12}$ of the MOSFETs $Q_{11}$ and $Q_{12}$, respectively.

As was explained in the foregoing, the drain-source voltages $V_{ds11}$ and $V_{ds12}$ when the MOSFETs $Q_{11}$ and $Q_{12}$ are made turned-off become voltages equivalent to the forward voltage drops in the fifth diodes $D_{12}$ and $D_{13}$, respectively. Hence, according to the example 11, like in the example 10, from the values of the forward voltages of the fifth diodes $D_{12}$ and $D_{13}$, the value of the currents flowing in the bypass circuits can be estimated. Accordingly, the example 11, like in the example 10, enables the rectifier circuit to be downsized and low cost.

Figure 18:
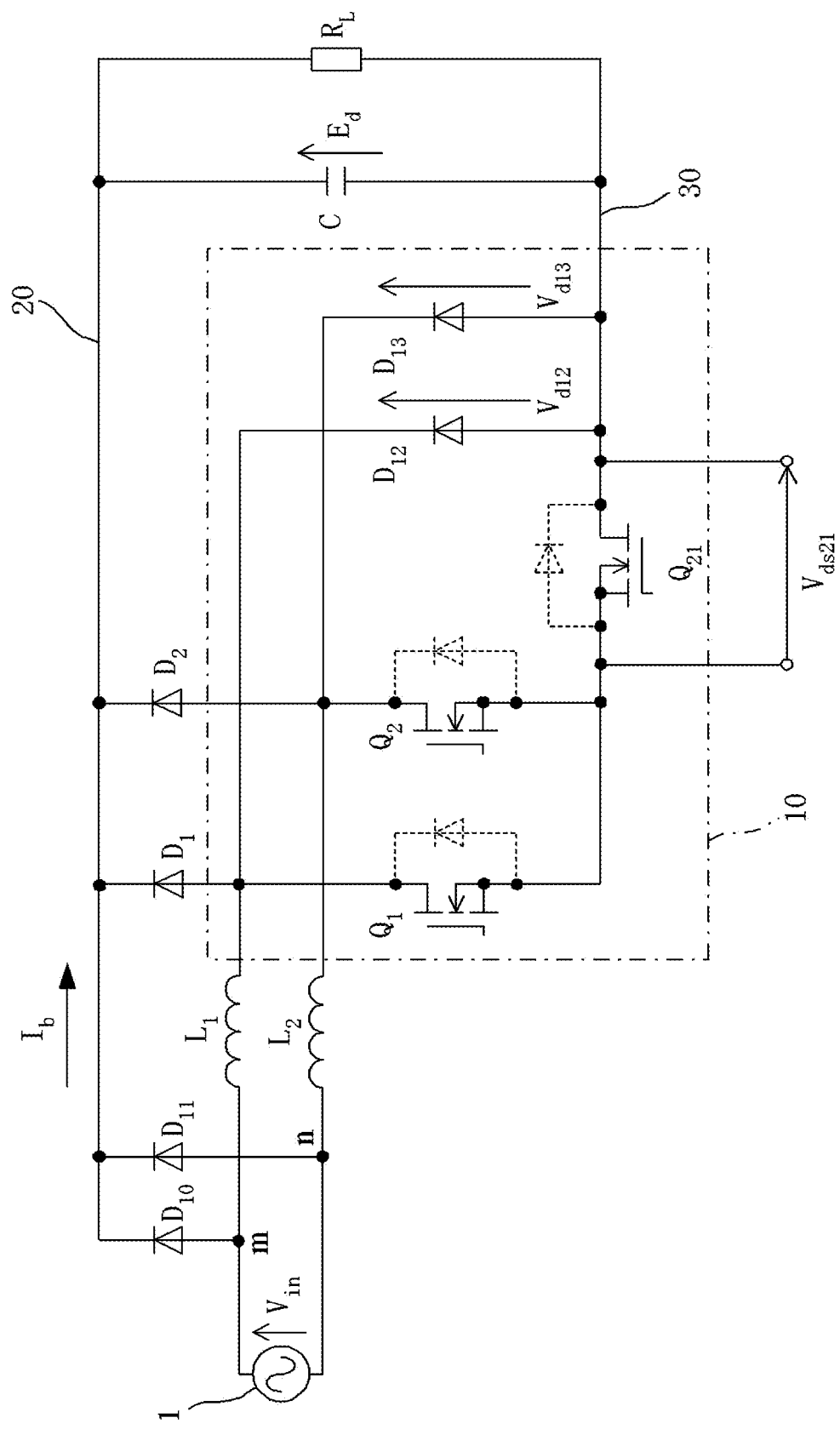
FIG. 18 is a circuit diagram showing a rectifier circuit according to another embodiment of the invention.

The invention is not limited to the circuit shown in FIG. 17 as the example 11, but can be modified to have a configuration in another embodiment as shown in FIG. 18 in which a drain-source voltage $V_{ds21}$ when a MOSFET $Q_{21}$ is made turned-off is used for estimating a current value. Namely, this is because the drain-source voltage $V_{ds21}$ at this time is equivalent to a forward voltage drop $V_{d12}$ in the fifth diode $D_{12}$ or a forward voltage drop $V_{d13}$ in the fifth diode $D_{13}$ ($V_{d12}$ when the polarity of an input voltage is positive and $V_{d13}$ when the polarity of an input voltage is negative). Therefore, as was explained before, a current value can be estimated from a forward voltage value of the diode.

In this way, the rectifier circuit according to the invention makes an inrush current flow in a slow recovery diode with a high forward surge current capability to bypass switching devices and fast recovery diodes with low forward surge current capabilities. Thus, the rectifier circuit provides the great practical advantages such as those of making the switching devices safely operated without being damaged.

While the present invention has been particularly shown and described with reference to the preferred embodiments thereof, it will be understood by those skilled in the art that the foregoing and other changes in form and details can be made therein without departing from the spirit and scope of the present invention.

What is claimed is:

1. A rectifier circuit comprising:
    an inductor with a first end thereof connected to an AC power supply;
    a plurality of series circuits in each of which a first end of a first diode and a first end of a switching section are connected to each other,
    to the connection point of the first end of the first diode and the first end of the switching section, the inductor being connected with a second end thereof;
    a first DC line to which a second end of the first diode in each of a plurality of the series circuits is connected;
    a second DC line to which a second end of the switching section in each of a plurality of the series circuits is connected;
    a capacitor connected between the first DC line and the second DC line;
    a second diode connected between the first end of the inductor and the first DC line; and
    a bypass circuit which is formed so that a charge current flowing from the AC power supply to the capacitor bypasses a plurality of the series circuits by making the switching sections out of conduction when the voltage of the AC power supply becomes higher than the voltage across the capacitor.

2. The rectifier circuit as claimed in claim 1 wherein the switching section comprises:
    a first semiconductor switching device to which a third diode is connected in inverse parallel; and
    a second semiconductor switching device to which a fourth diode is connected in inverse parallel,
    the first and second semiconductor switching devices being connected in series with their respective directions of conduction made opposite to each other,
    the bypass circuit having a fifth diode connected in parallel to the switching section, and
    the fifth diode having forward surge current capability higher than that of the first diode.

3. The rectifier circuit as claimed in claim 1 wherein the switching section comprises:
    a third diode connected in inverse parallel to a first semiconductor switching device,
    to the connection point of the first end of the first diode and the first end of the first semiconductor switching device, the inductor being connected with a second end thereof;
    a fourth diode connected in inverse parallel to the second semiconductor switching device; and
    a fifth diode connected between the second DC line and the connection point to which the first end of the first diode and the first end of the first semiconductor switching device in the series circuit are connected,
    the fifth diode having a forward surge current capability higher than that of the first diode.

4. The rectifier circuit as claimed in claim 2 wherein the first diode is substituted by a third semiconductor switching device with a sixth diode connected in inverse parallel thereto.

5. The rectifier circuit as claimed in claim 2 wherein the first diode is substituted by a second series circuit,
the second series circuit comprising:
a third semiconductor switching device with a sixth diode connected in inverse parallel thereto; and
a fourth semiconductor switching device with a seventh diode connected in inverse parallel thereto,
the third semiconductor switching device and the fourth semiconductor switching device being connected in series so that the directions of conduction of the sixth and seventh diodes become opposite to each other.

6. A rectifier circuit comprising:
a bridge circuit formed of four diodes of series connected two first diodes and series connected two fourth diodes, the fourth diode having a forward surge current capability higher than that of the first diode;
at least one inductor inserted between the bridge circuit and an AC power supply so that one end thereof is connected to the AC power supply and the other end thereof is connected to at least one of the connection point of the series connected two first diodes and the connection point of the series connected two fourth diodes in the bridge circuit;
a first and second DC lines in which a DC current outputted from the bridge circuit flows;
a capacitor connected between the first and second DC lines;
a first semiconductor switching device with a second diode connected in inverse parallel thereto;
a second semiconductor switching device with a third diode connected in inverse parallel thereto;
a series circuit in which the first semiconductor switching device and the second semiconductor switching device are connected in series so that the directions of conduction of the first and second switching devices become opposite to each other; and
a switching section in which the series circuit is connected in parallel to each of the series connected two fourth diodes to be connected between the first and second DC lines.

7. The rectifier circuit as claimed in claim 2 wherein the fifth diode is formed of a plurality of diodes connected in series.

8. The rectifier circuit as claimed in claim 4 wherein the fifth diode is formed of a plurality of diodes connected in series.

9. A rectifier circuit comprising:
an inductor with a first end thereof connected to an AC power supply;
a plurality of series circuits in each of which a first end of a first diode and a first end of a switching section are connected to each other,
to the connection point of the first end of the first diode and the first end of the switching section, the inductor being connected with a second end thereof;
a first DC line to which a second end of the first diode in each of a plurality of the series circuits is connected;
a second DC line to which a second end of the switching section in each of a plurality of the series circuits is connected;
a capacitor connected between the first DC line and the second DC line;
a second diode connected between the first end of the inductor and the first DC line; and
a bypass circuit which is formed so that a charge current flowing from the AC power supply to the capacitor bypasses a plurality of the series circuits by making the switching sections out of conduction when the value of a current flowing from the AC power supply to the switching sections becomes equal to or larger than a specified value,
the switching section being made in conduction again when the value of the charge current becomes equal to or smaller than the specified value.

10. The rectifier circuit as claimed in claim 9 wherein the switching section comprises:
a first semiconductor switching device to which a third diode is connected in inverse parallel; and
a second semiconductor switching device to which a fourth diode is connected in inverse parallel,
the first and second semiconductor switching devices being connected in series with their respective directions of conduction made opposite to each other,
the bypass circuit having a fifth diode connected in parallel to the switching section, and
the fifth diode having forward surge current capability higher than the first diode.

11. The rectifier circuit as claimed in claim 9 wherein the switching section comprises:
a third diode connected in inverse parallel to a first semiconductor switching device,
to the connection point of the first end of the first diode and the first end of the first semiconductor switching device, the inductor being connected with a second end thereof;
a fourth diode connected in inverse parallel to the second semiconductor switching device; and
a fifth diode connected between the second DC line and the connection point to which the first end of the first diode and the first end of the first semiconductor switching device in the series circuit are connected,
the fifth diode having a forward surge current capability higher than that of the first diode.

12. The rectifier circuit as claimed in claim 10 wherein the first diode is substituted by a third semiconductor switching device with a sixth diode connected in inverse parallel thereto.

13. The rectifier circuit as claimed in claim 10 wherein the first diode is substituted by a second series circuit,
the second series circuit comprising:
a third semiconductor switching device with a sixth diode connected in inverse parallel thereto; and
a fourth semiconductor switching device with a seventh diode connected in inverse parallel thereto,
the third semiconductor switching device and the fourth semiconductor switching device being connected in series so that the directions of conduction of the sixth and seventh diodes become opposite to each other.

14. The rectifier circuit as claimed in claim 9 wherein the charge current is detected by a current detector inserted into a path of a current flowing in the bypass circuit.

15. The rectifier circuit as claimed in claim 12 wherein the charge current is detected by a current detector inserted into a path of a current flowing in the bypass circuit.

16. The rectifier circuit as claimed in claim 9 wherein the charge current is detected by a first voltage detector detecting the anode-cathode voltage of the fifth diode.

17. The rectifier circuit as claimed in claim 12 wherein the charge current is detected by a first voltage detector detecting the anode-cathode voltage of the fifth diode.

18. The rectifier circuit as claimed in claim 9 wherein the charge current is detected by a second voltage detector detecting a voltage between the main circuit terminals of the second switching device in the switching section.

19. The rectifier circuit as claimed in claim 12 wherein the charge current is detected by a second voltage detector detecting a voltage between the main circuit terminals of the second switching device in the switching section.

20. The rectifier circuit as claimed in claim 9 wherein the fifth diode is formed of a plurality of diodes connected in series.

21. The rectifier circuit as claimed in claim 12 wherein the fifth diode is formed of a plurality of diodes connected in series.

\* \* \* \* \*